(12) United States Patent
Prater et al.

(10) Patent No.: US 11,507,594 B2
(45) Date of Patent: Nov. 22, 2022

(54) BULK DATA DISTRIBUTION SYSTEM

(71) Applicant: Amazon Technologies, Inc., Seattle, WA (US)

(72) Inventors: Alexander Clark Prater, Seattle, WA (US); Victor Gregory Estevez, Seattle, WA (US); Matthew Rice Carlson, Seattle, WA (US); Nipun Dureja, Seattle, WA (US); Yung-Chun Lin, Seattle, WA (US); Udit Madan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 906 days.

(21) Appl. No.: 15/640,887

(22) Filed: Jul. 3, 2017

(65) Prior Publication Data

US 2017/0300551 A1   Oct. 19, 2017

Related U.S. Application Data

(63) Continuation of application No. 14/488,022, filed on Sep. 16, 2014, now Pat. No. 9,697,268.

(51) Int. Cl.
| | | |
|---|---|---|
| *G06F 16/00* | (2019.01) | |
| *G06F 16/27* | (2019.01) | |
| *G06F 11/14* | (2006.01) | |
| *G06F 16/20* | (2019.01) | |
| *G06F 3/06* | (2006.01) | |

(52) U.S. Cl.
CPC .............. *G06F 16/27* (2019.01); *G06F 3/061* (2013.01); *G06F 3/065* (2013.01); *G06F 3/067* (2013.01); *G06F 11/1451* (2013.01); *G06F 16/00* (2019.01); *G06F 16/20* (2019.01)

(58) Field of Classification Search
CPC ............................... G06F 16/128; G06F 16/27
See application file for complete search history.

(56) References Cited

U.S. PATENT DOCUMENTS

| | | |
|---|---|---|
| 6,434,681 B1 | 8/2002 | Armangau |
| 6,877,016 B1 | 4/2005 | Hart et al. |
| 8,438,247 B1 | 5/2013 | Certain et al. |
| 9,294,564 B2 | 3/2016 | Sorenson |
| 9,304,867 B2 | 4/2016 | Sivasubramanian et al. |
| 9,697,268 B1 | 7/2017 | Prater et al. |

(Continued)

*Primary Examiner* — Thu Nguyet T Le
(74) *Attorney, Agent, or Firm* — Robert C. Kowert; Kowert, Hood, Munyon, Rankin & Goetzel, P.C.

(57) ABSTRACT

A bulk data distribution system in which, instead of multiple data consumers contending to access the same data sets from a primary data store, one or more producers capture snapshots (states of the data sets at particular points in time) and upload the snapshots to an intermediate data store for access by snapshot consumers. The snapshot consumers may download the snapshots to generate local versions of the data sets for access by one or more data processing applications or processes. A snapshot producer may periodically generate full snapshots of a data set, and may generate one or more incremental snapshots of the data set between full snapshots. A snapshot consumer may bootstrap a local data set from a full snapshot and one or more incrementals, and may maintain state of the local data set by accessing new snapshots uploaded by the producer.

20 Claims, 15 Drawing Sheets

(56) References Cited

U.S. PATENT DOCUMENTS

| | | | |
|---|---|---|---|
| 2003/0182313 A1* | 9/2003 | Federwisch | G06F 16/10 |
| | | | 714/E11.107 |
| 2005/0108292 A1* | 5/2005 | Burton | G06F 3/0608 |
| 2010/0274763 A1* | 10/2010 | Ingen | G06F 11/1469 |
| | | | 707/645 |
| 2011/0161295 A1* | 6/2011 | Ngo | G06F 11/1471 |
| | | | 707/639 |
| 2013/0346480 A1 | 12/2013 | Certain et al. | |
| 2014/0006354 A1* | 1/2014 | Parkison | G06F 3/067 |
| | | | 707/649 |
| 2014/0337664 A1* | 11/2014 | Gokhale | G06F 3/0619 |
| | | | 714/6.3 |
| 2015/0142745 A1 | 5/2015 | Tekade et al. | |
| 2019/0108231 A1* | 4/2019 | Patterson | G06F 11/1464 |

\* cited by examiner

BULK DATA DISTRIBUTION SYSTEM

This application is a continuation of U.S. patent application Ser. No. 14/488,022, filed Sep. 16, 2014, now U.S. Pat. No. 9,697,268, which is hereby incorporated by reference herein in its entirety.

BACKGROUND

Many enterprises may maintain data sets that may be accessed and modified in production environments. For example, a merchant may operate one or more order fulfillment centers that receive and store items to locations in inventory, receive orders for items, retrieve the ordered items from locations in inventory, and ship the items to respective destinations. Each fulfillment center may maintain a large data store or database, for example a relational database, that includes data sets for various aspects of the order fulfillment process including but not limited to inventory (e.g., inventory content, counts, locations, etc.) and picking (e.g., picking demand based at least in part on orders to be fulfilled) data sets. These production data sets may be large, and may be constantly changing as items are added to, moved in, and picked from inventory. Various systems, applications, or processes of the enterprise may be data consumers that need to access one or more of the data sets from a data store or database, and these processes generally need access to fresh, up-to-date views of the data sets.

Figure 1:
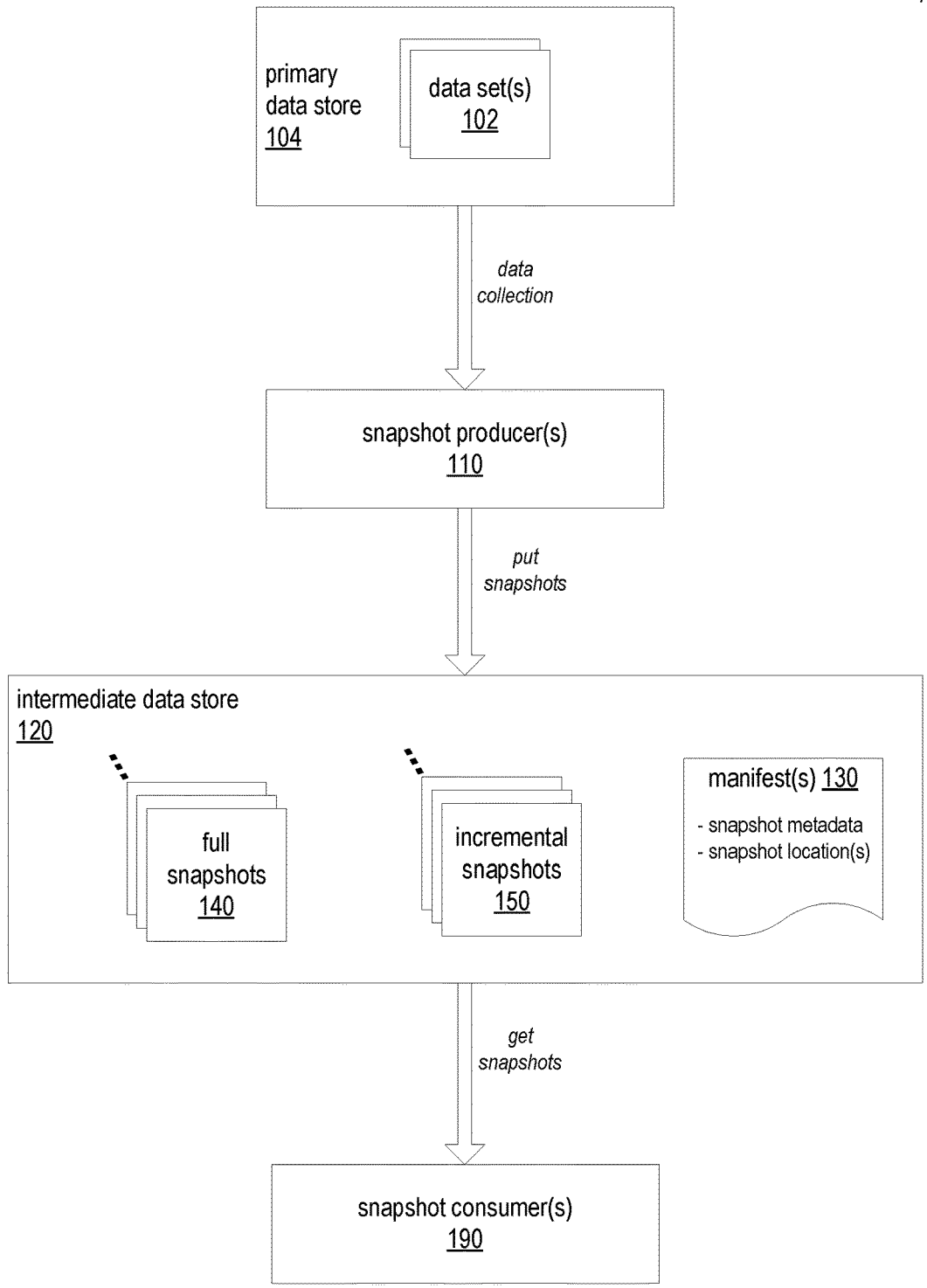
FIG. 1 is a high-level block diagram illustrating a bulk data distribution system, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for distributing bulk data are described. In many enterprise environments, multiple clients (referred to as data consumers) may need to consume large amounts of data from common data sets or databases, for example production data sets in a fulfillment network of an online merchant. Conventional methods for accessing the data sets may involve multiple different systems making service calls and accessing the data sets to pull down the data they need from the same primary data source, for example from a large relational database. This may lead to contention between systems for access to the data sets, which may result in delays in accessing the data for at least some systems and thus cause the data that is pulled down to be stale, that is inconsistent with the current state of the primary data set. Further, these conventional methods tend not to be scalable on the data store side or on the data consumer side. Moreover, these conventional methods may involve many service calls and the transmission of massive amounts of data over an enterprise network, which may for example cause bandwidth and bottleneck problems among others.

Embodiments of a bulk data distribution system are described in which, instead of multiple data consumers contending to access the same data sets, for example data sets from a primary data store on a production network, one or more producer modules, processes, or systems capture data representing the state of the data sets at particular points in time and upload the captured data to an intermediate data store for access by one or more consumer modules.

A data set may include multiple data elements (e.g., entries, lines, items, records, etc.). The data captured from a data set at a point in time may be referred to as point-in-time data, or as a snapshot of the data set. A snapshot of a data set may be broadly defined as a capture of the state of the data set at a particular point in time. Since a point in time state of the data set is captured, the data that is captured in a snapshot (e.g., the state of one or more data elements of the data set) is internally, temporally consistent. A full snapshot of a data set may be broadly defined as a capture of the state of the entire or full data set (e.g., of all data elements in the data set) at a particular point in time. An incremental snapshot of a data set may be broadly defined as a capture, at a particular point in time, of only the changes to the data set (e.g., of only those data elements of the data set that have been added, modified, or deleted) since a previous snapshot (either a full or an incremental snapshot) of the data set.

In some embodiments, the data sets for which snapshots may be captured by snapshot producer processes or modules may include data sets stored as or in files, tables, or the like on data storage device(s) of a data storage system. For example, the data sets may be stored as or in database files or tables within a primary database maintained on a data storage system on an enterprise's network (e.g., a merchant's fulfillment center network), and one or more snapshot producer processes may capture states of the data sets from the data storage system at particular points in time and upload the states of the data sets to an intermediate data store as snapshots of the data sets. In some embodiments, instead of or in addition to data sets stored on data storage systems, the data sets for which snapshots may be captured may include data sets stored in a memory or memories of one or more computing devices of an enterprise; one or more snapshot producer processes may capture states of the data sets from the memory of one or more computing devices at particular points in time and upload the states of the data sets to an intermediate data store as snapshots of the data sets. In some embodiments, snapshots may include states of data captured from other sources than storage devices and memory, for example point-in-time data captured from registers of one or more computing devices of an enterprise. In some embodiments, snapshots may capture states of data from two or more sources, for example states of data stored on disks in a data storage system as well as states of data from memory on one or more computing devices.

While embodiments of snapshot producer processes or modules are generally described as capturing states of production data sets accessed by production processes of an enterprise, in some embodiments snapshots of other data or data from other sources may be captured by snapshot producer processes or modules and uploaded as snapshots to an intermediate data store for consumption by snapshot consumer(s). For example, in some embodiments, the point-in-time state of system-level data for an enterprise network such as operating system (OS) data or files, application performance metrics, network performance metrics, and hardware status may be captured and uploaded as point-in-time snapshots to the intermediate data store.

FIG. 1 is a high-level block diagram illustrating an example bulk data distribution system 100, according to at least some embodiments. Bulk data distribution system 100 may include a primary data store 104 that stores one or more primary or production data sets 102, one or more snapshot producers 110, an intermediate data store 120, and one or more snapshot consumers 190.

Figure 10:
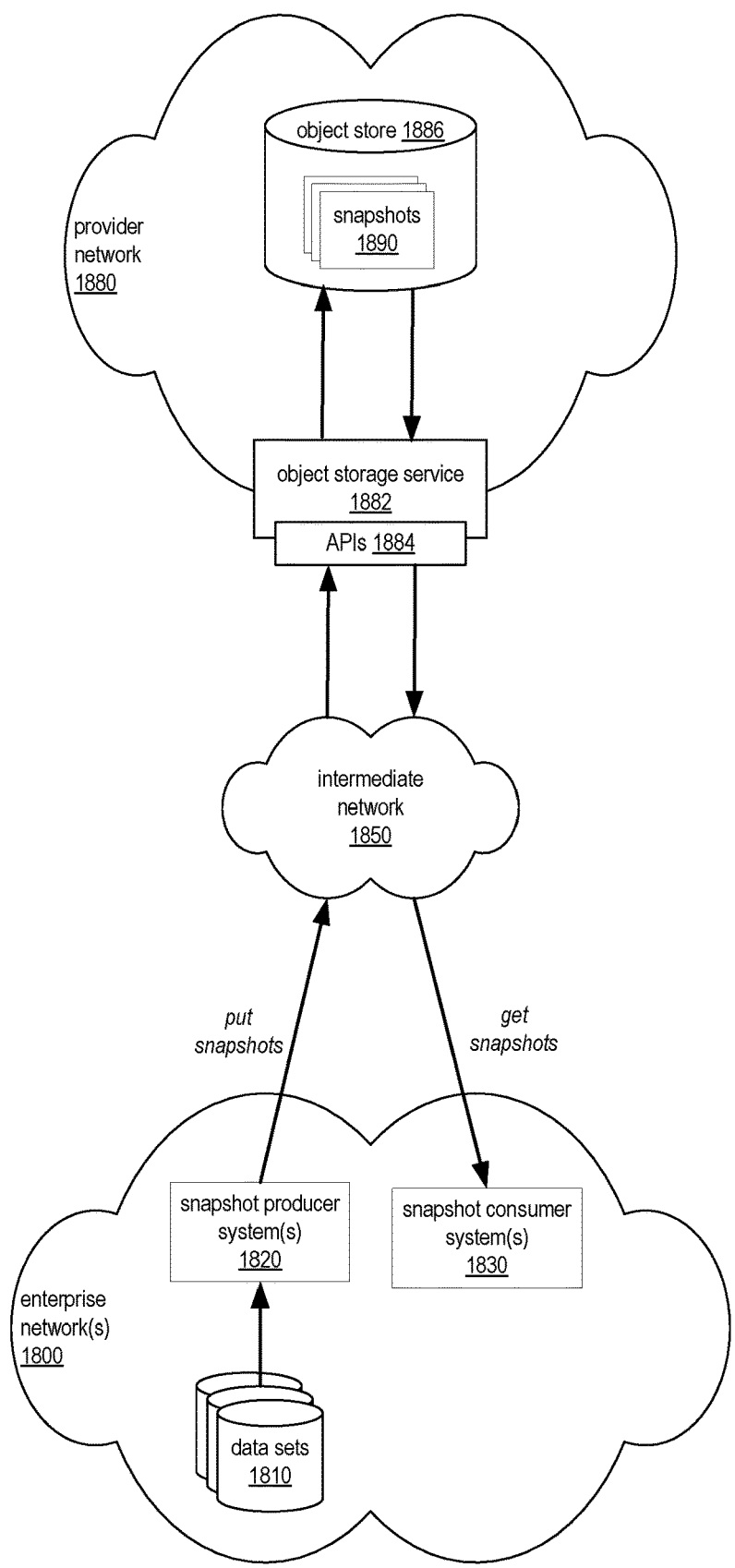
FIG. 10 illustrates an example service provider network environment in which embodiments of methods and apparatus for distributing bulk data may be implemented.
Figure 11:
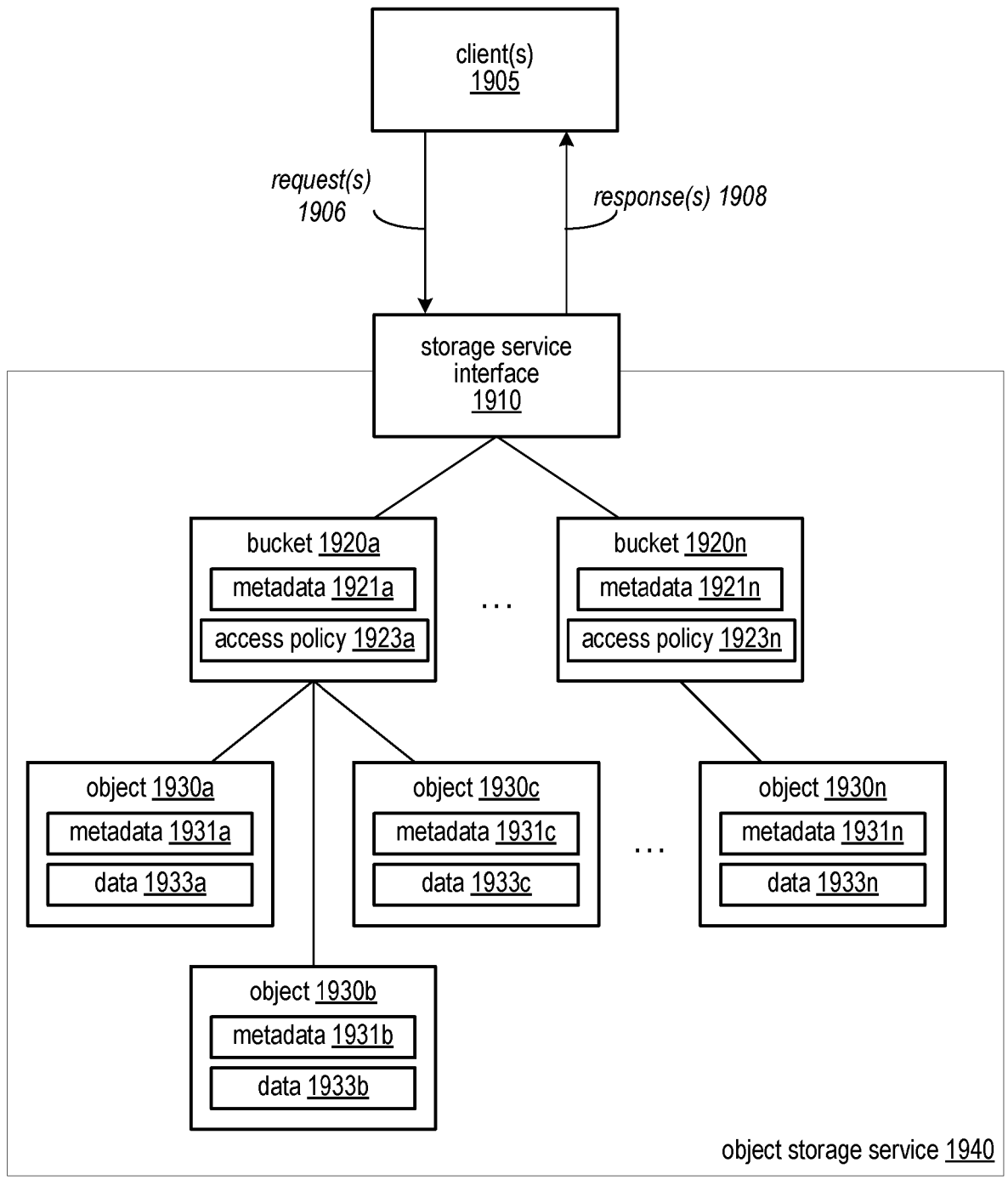
FIG. 11 illustrates an example embodiment of an unstructured object storage model for providing virtualized storage resources to clients as a service.

In some embodiments, primary data store 104 may be implemented as or on a storage system (e.g., network-accessible storage (NAS), storage area network (SAN) storage, etc.) within an enterprise's network environment (e.g., within a fulfillment network of a merchant), or within a local network in a facility of an enterprise (e.g., within a fulfillment center of a merchant). However, in some embodiments, a primary data store 104 may be implemented as a virtualized data store, for example an unstructured object store, provided via a storage service in a service provider network environment, for example as illustrated in FIGS. 10 and 11. One or more production processes 106 may actively access and modify data sets 102 on the primary data store 104 in a production environment of an enterprise. As a non-limiting example, one or more inventory management and/or pick processes may access one or more inventory- and picking-related data sets within a fulfillment center of a merchant. The inventory- and picking-related data sets may, for example, include an inventory item data set that includes records that contain information for items within inventory of the fulfillment center, an inventory location data set that includes records that contain information for locations (e.g., bins) within inventory of the fulfillment center, and a picking data set that includes records that contain information for orders or items that are to be picked from the locations in the inventory of the fulfillment center.

In some embodiments, intermediate data store 120 may be a virtualized data store, for example an unstructured object store, provided to clients via a storage service in a service provider network environment. In some embodiments, the storage service may provide an interface (e.g., one or more application programming interfaces (APIs)) via which snapshot producers 110 may upload snapshots to the intermediate data store 120 and via which snapshot consumers 190 may access snapshots from the intermediate data store 120. FIG. 10 illustrates an example service provider network environment in which an embodiment of bulk data distribution system 100 may be implemented. FIG. 11 illustrates an example embodiment of an unstructured object storage model for providing virtualized storage resources to clients as a service that may be used in some embodiments. However, bulk data distribution system 100 and intermediate data store 120 may be otherwise implemented. For example, bulk data distribution system 100 may be implemented within an enterprise's network environment, and intermediate data store 120 may be a storage system (e.g., network-accessible storage (NAS) or storage area network (SAN) storage) within the enterprise's network environment.

In some embodiments, there may be one snapshot producer 110 per data set 102 in the primary data store 104, thus reducing the number of processes that access a given data set 102 from the primary data source. In some embodiments, a snapshot producer 110 may periodically generate and upload full snapshots 140 of a primary data set 102 to an intermediate data store 120, and may also generate and upload one or more incremental snapshots 150 between the full snapshots 140 either on a periodic schedule or when a change in data has been detected. In some embodiments, a full snapshot 140 of a data set 102 captures a consistent state of the primary data set 102 at a particular point in time. For example, a data set 102 may be an inventory item data set that includes records corresponding to inventory items within a fulfillment center. A full snapshot of the inventory item data set may capture the current content or value of one or more fields in each record of the data set at a particular point in time. In some embodiments, to ensure that a consistent state of the data set 102 is captured at a particular point in time, the snapshot producer 110 may temporarily lock or block write access to the data set 102 while data for the full snapshot 140 of the data set 102 is being collected. In some embodiments, an incremental snapshot 150 of a data set 102 captures changes to the primary data set 102 since a most recent previous snapshot (either full 140 or incremental 150) of the data set 102.

In some embodiments, snapshot consumers 190 may download the snapshots 140 and 150 from the intermediate data store 120 and use the snapshots to establish and maintain local versions of a primary data set 102 (referred to as local data sets) for access by data processing modules, processes, or applications that need access to the data. In some embodiments, there may be one, two, or more snapshot consumers 190 for each data set 102 (and thus for each snapshot producer 110). In some embodiments, additional snapshot consumers 190 may be added for a given data set 102 without requiring additional snapshot producers 110 or adding any extra load on an existing snapshot producer 110. In some embodiments, a snapshot consumer 190 may discover and access snapshots 140 and 150 for one, two, or more different data sets 102.

In some embodiments, a snapshot consumer 190 may bootstrap a local version of a data set 102 by obtaining a most recent full snapshot 140 from the intermediate data store 120 to establish the local data set, and then obtaining and applying one or more incremental snapshots 150 that were generated and uploaded after the full snapshot 140 to bring the local data set up to date. In some embodiments, after bootstrapping the local data set, the snapshot consumer 190 may monitor the intermediate data store 120 to detect new snapshots 140 or 150 for the data set, downloading and applying the new snapshots to the local data set to maintain a current state for the local data set that is close to the state of the primary data set 102 on the primary data store.

For example, in some embodiments, a snapshot producer 110 may generate a full snapshot 140 for a primary data set 102 at a specified interval, for example every ten minutes, once an hour, or every six hours. The snapshot producer 110 may also generate incremental snapshots 150 for the primary data set 102 at shorter intervals, for example once a minute or once an hour, to capture changes to the primary data set 102 since the last full snapshot 140. Note that the intervals used for full and/or incremental snapshots of a given data set 102 may vary based upon various factors including but not limited to the type and amount of data in the data set 102 and requirements of the consumer(s) 190 of the data set 102. The generated full 140 and incremental 150 snapshots are uploaded to the intermediate data store 120. A snapshot consumer 190 may then access the snapshots to establish and maintain a local version of the data set 102. Note that the frequency at which a snapshot consumer 190 downloads snapshots to update a local version of a data set 102 may depend on factors including but not limited to the particular data processing application(s) that access the local data set; some consumer-side applications may require the local data to be as fresh and consistent with the primary data set 102 as possible, while other applications may not require the data to be as fresh or up-to-date.

In some embodiments, a library may be provided for use by snapshot consumers 190 in discovering and accessing the snapshots 140 and 150 from the intermediate data store 120. In some embodiments, the snapshots 140 and 150 may be generated by the snapshot producers 110 according to a data format that is used in the library and that is common across the snapshot producers 110 and data sets, for example a JavaScript Object Notation (JSON) data format. In some embodiments, the snapshots 140 and 150 may be compressed prior to uploading to the intermediate data store 120. In some embodiments, the snapshots 140 and 150 may be encrypted prior to uploading to the intermediate data store 120.

Providing a library and generating the snapshots 140 and 150 according to a common format may allow a snapshot producer 110 to vend data to multiple snapshot consumers 190 in a predetermined file format, and may simplify the implementation of snapshot consumers 190 and allow the consumers 190 to more easily access data from different data sets 102. Since the bulk data distribution system 100 provides an intermediate data store 120 that stores full 140 and incremental 150 snapshots of data sets 102 that are available to data consumers through a common library, the data consumers may not need to build and maintain complex caching layers to cache production data.

In some embodiments, the bulk data distribution system 100 may archive full 140 and incremental 150 snapshots, and a process or application may use the bulk data distribution system 100 to retrieve archived snapshots from one or more data sets 102 to reconstruct the state of a data set or data system at a given point in time. In some embodiments, a process or application may retrieve full and/or incremental snapshots for one or more data sets and use the retrieved snapshots to reproduce or replay activities in a data set, data sets, or data system over a period in an offline or simulation environment. For example, a snapshot producer 110 may generate full 140 and incremental 150 snapshots for one or more data sets 102, for example data sets of a picking process of a fulfillment center. A snapshot consumer 190 may pull down and process (e.g., decompress and decrypt, if the snapshots are compressed and encrypted) full 140 and incremental 150 snapshots over a historical time period, and feed the processed data from the snapshots to an offline process that simulates activities over time according to the input historical data. For example, picking process data may be fed to a process that replays picking activities in a fulfillment center according to historical picking data input from snapshots of one or more picking data sets.

In some embodiments, the bulk data distribution system 100 may use snapshot manifests 130 to record and retrieve information about full 140 and incremental 150 snapshots. In some embodiments, a separate manifest 130 may be maintained for each data set 102 in a primary database or data system for which snapshots are generated. In some embodiments, a snapshot producer 110 may create and maintain snapshot manifest(s) 130 for a data set 102. In some embodiments, a new manifest 130 is created for a data set 102 for each new full snapshot 140 of the data set 102; the manifest 130 may be updated with information for each incremental snapshot 150 captured after the respective full snapshot 140. In some embodiments, the manifests 130 for a data set 102 may be versioned and/or time stamped so that consumers 190 can locate snapshots 140 and 150 of the data set 102 from particular times. In some embodiments, instead of creating new manifests 130 for new snapshots 140, an existing manifest 130 for a data set 102 is updated for each new full 140 and incremental 150 snapshot of the data set 102.

A snapshot manifest 130 for a data set 102 may, for example, identify and indicate locations in the intermediate data store 120 of at least the most recently created full snapshot 140 of the data set 102, and of one or more incremental snapshots 150 for the data set 102 if created. For example, date and time stamps may be used to identify full 140 and incremental 150 snapshots for a data set 102, and universal resource locators (URLs) may be used to indicate the locations of the snapshots in the data store 120. A snapshot consumer 190 may access and search the snapshot manifest(s) 130 to locate, determine availability of, and get locations for obtaining full 140 and/or incremental 150 snapshots for data set(s) 102 from the intermediate data store 120. In some embodiments, in addition to location information, snapshot manifest 130 may include other metadata for each snapshot. For example, in some embodiments, a snapshot manifest 130 may include a hash of each snapshot (e.g., an MD5 128-bit hash). In some embodiments, sequence identifiers may be included for incremental snapshots 150 that may be used to determine the order in which the incremental snapshots 150 should be processed.

In some embodiments, the manifests 130 may be stored and maintained in a common location shared by all producers 110 and consumers 190 so that the producers 110 and consumers 190 know where to locate the manifests 130 for updating, searching, etc. In some embodiments, as shown in FIG. 1, the manifests 130 may be stored in the intermediate data store 120 with the full 140 and incremental 150 snapshots. However, the manifests 130 may be stored elsewhere in other embodiments.

In some embodiments, for at least some data sets 102, a full snapshot 140 of the data set may be large, and thus, instead of storing the entire snapshot 140 as one large blob of data, the snapshot 140 may be stored to the intermediate data store 120 in two or more parts or "chunks." In these cases, the manifest 130 for the snapshot 140 may include locators and other information for each chunk of the full snapshot 140, as well as a chunk identifier (e.g., chunk 1, chunk 2, etc.)

While FIG. 1 shows snapshot manifests 130 stored in intermediate data store 120 with the snapshots, in some embodiments the snapshot manifests 130 may be stored elsewhere, for example in other data storage or data storage systems that are accessible to both the snapshot producers 110 and snapshot consumers 190. For example, in some embodiments, the intermediate data store 120 to which full 140 and incremental 150 snapshots are stored may be an unstructured object store provided to clients via a an object storage service in a service provider network environment as illustrated in FIGS. 10 and 11. In some embodiments, the service provider network may also provide structured data storage such as file or database storage, for example via a structured data storage service such as a file or database storage service, that the bulk data distribution system 100 may leverage to store and maintain the manifests 130 for the data sets 102. In some embodiments, the structured data storage service may provide read-after-write consistency for new data writes to the manifest.

While FIG. 1 shows full 140 and incremental 150 snapshots being captured for data sets 102, in some embodiments, for at least some data sets 102, only full snapshots 140 may be generated. For example, for relatively small data sets 102, full snapshots 140 may be quickly and easily generated, and so incrementals may not be required. As another example, for data sets 102 that are updated relatively infrequently, incrementals may not be required.

Figure 2:
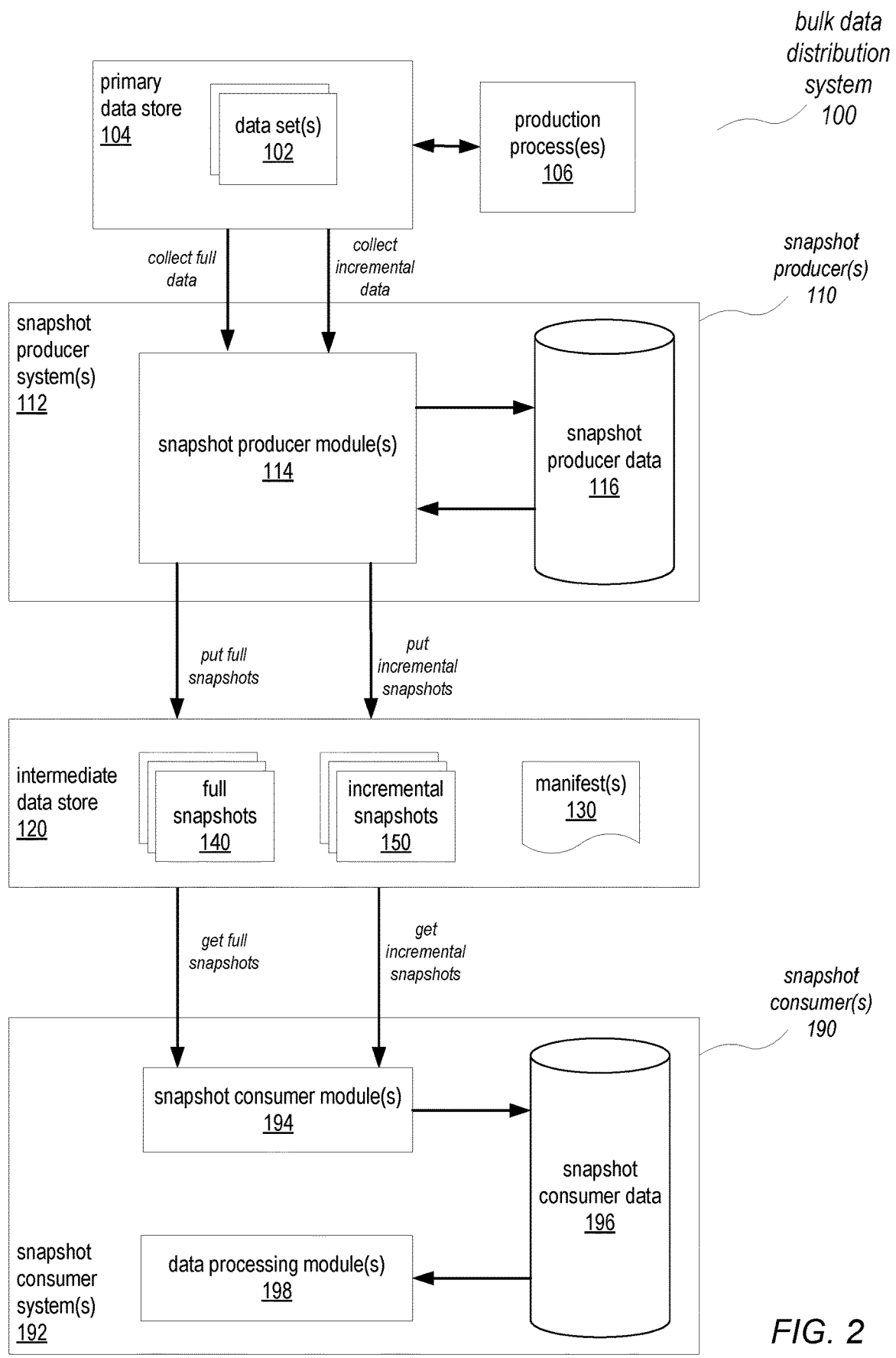
FIG. 2 is a block diagram illustrating a bulk data distribution system in more detail, according to at least some embodiments.

FIG. 2 is a block diagram illustrating a bulk data distribution system 100 in more detail, according to at least some embodiments. In some embodiments, bulk data distribution system 100 may be implemented within an enterprise's network environment (e.g., within a fulfillment network of a merchant), or within a local network in a facility of an enterprise (e.g., within a fulfillment center of a merchant). In some embodiments, bulk data distribution system 100 may include a primary data store 104 that stores one or more primary or production data sets 102, one or more snapshot producers 110, an intermediate data store 120, and one or more snapshot consumers 190. In some embodiments, snapshot producers 110 and snapshot consumers 190 may be implemented within a same network, for example within a local network in a facility of an enterprise (e.g., within a fulfillment center of a merchant). However, in some embodiments, at least one snapshot consumer 190 may be implemented on a different network than the snapshot producer(s) 110.

In some embodiments, primary data store 104 may be implemented as or on a storage system (e.g., network-accessible storage (NAS), storage area network (SAN) storage, etc.) within an enterprise's network environment (e.g., within a fulfillment network of a merchant), or within a local network in a facility of an enterprise (e.g., within a fulfillment center of a merchant). However, in some embodiments, a primary data store 104 may be implemented as a virtualized data store, for example an unstructured object store, provided via a storage service in a service provider network environment, for example as illustrated in FIGS. 10 and 11. One or more production processes 106 may actively access and modify data sets 102 on the primary data store 104 in a production environment of an enterprise. For example, one or more inventory and/or pick processes may access data sets 102 within a fulfillment center of a merchant.

Figure 12:
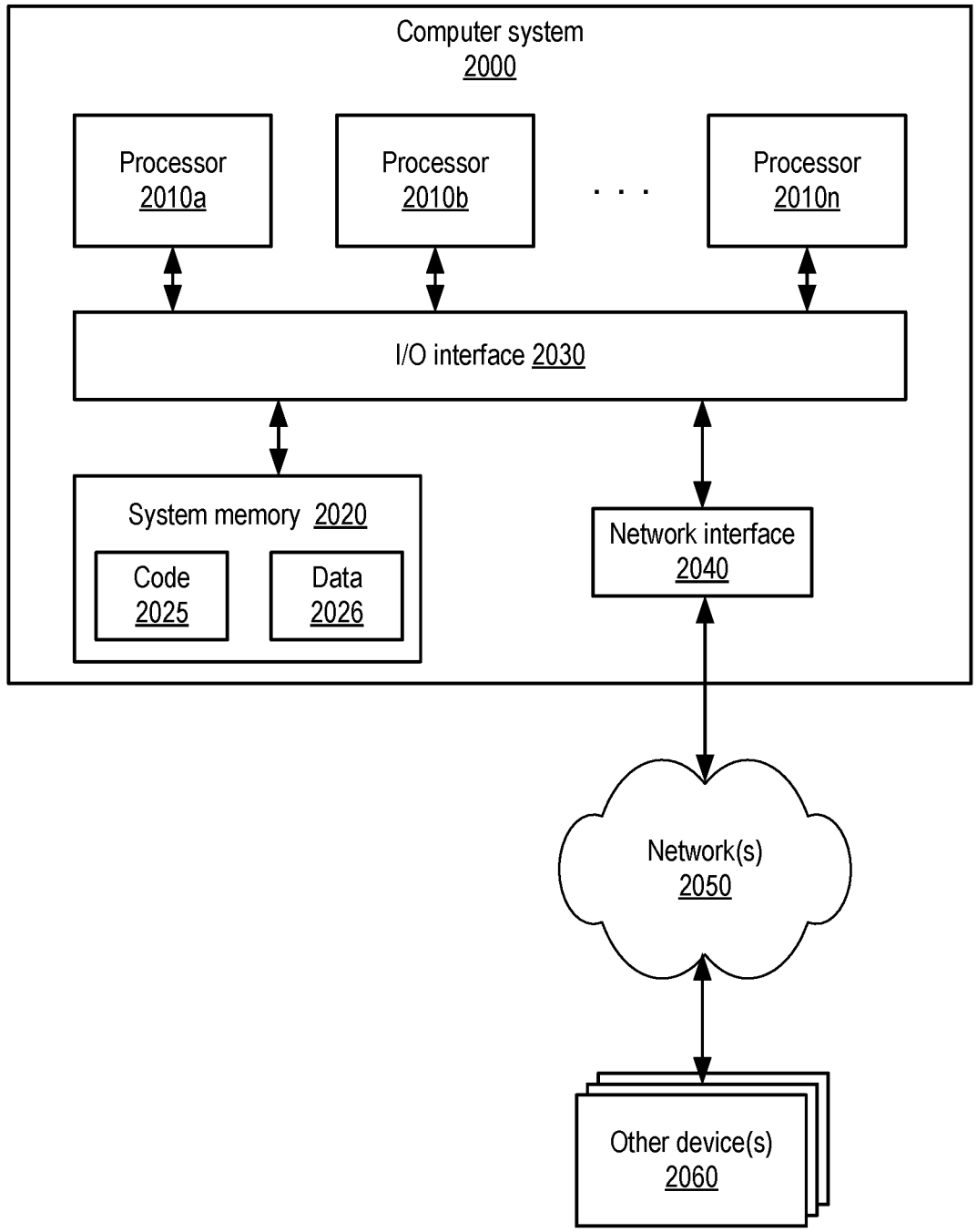
FIG. 12 is a block diagram illustrating an example computer system that may be used in some embodiments.

In some embodiments, snapshot producer(s) 110 may be implemented as or by one or more snapshot producer systems 112. Snapshot producer system(s) 112 may include one or more computer devices or systems such as servers, mainframes, storage devices, and so on. FIG. 12 illustrates an example computer system that may be used in a snapshot producer system 112 in some embodiments. Snapshot producer system(s) 112 may implement one or more snapshot producer modules 114 that perform snapshot production tasks including collecting data from the primary data store 104 for snapshots and uploading the snapshots to the intermediate data store 120. Snapshot producer modules 114 may be implemented as software, hardware, or a combination thereof.

In some embodiments, each snapshot producer module 114 may correspond to a particular data set 102 in primary data store 104, and may collect data for snapshots for that particular data set 102. In some embodiments, a snapshot producer module 114 may access two or more data sets 102 to collect data for snapshots. In some embodiments, one or more snapshot producer modules 114 may access a particular data set 102.

In some embodiments, a snapshot producer module 114 may include two or more components or submodules. For example, in some embodiments, a snapshot producer module 114 may implement a full snapshot component or process that generates full snapshots 140, and an incremental snapshot component or process that generates incremental snapshots 150. For example, in some embodiments, a full snapshot process of a snapshot producer module 114 may be scheduled to wake up at a specified interval, for example every ten minutes, once an hour, or every six hours, collect data for a full snapshot 140 from a data set 102 on data store 104, initiate an upload of the full snapshot 140 to the intermediate data store 120, and then go back to sleep until time for the next full snapshot 140 to be captured. Meanwhile, an incremental snapshot process of the snapshot producer module 114 may monitor and capture data for the data set 102 that has changed since a last (full or incremental) snapshot and initiate uploads of the incremental snapshots 150 to the intermediate data store 120 at shorter intervals, for example once a minute, once every five minutes, or once an hour.

Snapshot producer system(s) 112 may also provide memory or storage where snapshot producer data 116 may be cached or stored. For example, a full snapshot process of a snapshot producer module 114 may collect data from a data set 102 and locally cache the data to a memory of snapshot producer system(s) 112 as snapshot producer data 116 until the full snapshot 140 is complete and ready to be uploaded to the intermediate data store 120.

In some embodiments, intermediate data store 120 may be a virtualized data store, for example an unstructured object store, provided via a storage service in a service provider network environment. FIG. 10 illustrates an example service provider network environment in which an embodiment of bulk data distribution system 100 may be implemented. FIG. 11 illustrates an example embodiment of an unstructured object storage model for providing virtualized storage resources to clients as a service that may be used in some embodiments. However, bulk data distribution system 100 and intermediate data store 120 may be otherwise implemented. For example, bulk data distribution system 100 may be implemented within an enterprise's network environment, and intermediate data store 120 may be a storage system (e.g., network-accessible storage (NAS) or storage area network (SAN) storage) within the enterprise's network environment.

In some embodiments, snapshot consumer(s) 190 may be implemented as or by one or more snapshot consumer systems 192. Snapshot consumer system(s) 192 may include one or more computer devices or systems such as servers, mainframes, storage devices, and so on. FIG. 12 illustrates an example computer system that may be used in a snapshot consumer system 192 in some embodiments. Snapshot consumer system(s) 192 may implement one or more snapshot consumer modules 194 that may, for example, monitor intermediate data store 120 for new full 140 or incremental 150 snapshots and download the new snapshots from the intermediate data store 120 when available. Snapshot consumer modules 194 may be implemented as software, hardware, or a combination thereof.

In some embodiments, snapshot consumer modules 194 may download snapshots 140 and 150 from the intermediate data store 120 and use the snapshots to establish and maintain local versions of primary data sets 102 (referred to as local data sets) for access by data processing modules, processes, or applications 198 that need access to the data. Snapshot consumer system(s) 192 may provide memory or storage where snapshot consumer data 196, for example local versions of primary data sets 102, may be cached or stored, and from which data processing modules 198 may access the local versions of the data sets 102.

In some embodiments, each snapshot consumer module 194 may correspond to a particular data set 102 in primary data store 104, and may monitor for and download snapshots for that particular data set 102. In some embodiments, a snapshot consumer module 194 may monitor and download snapshots for two or more data sets 102. In some embodiments, snapshots for a particular data set 102 may be monitored by one, two or more snapshot consumer module 194. In some embodiments, there may be one, two, or more snapshot consumer modules 194 for each data set 102. In some embodiments, additional snapshot consumer modules 194 may be added for a given data set 102 without requiring additional snapshot producer modules 114 for the data set, and without adding any extra load on the existing snapshot producer module 114 for the data set 102. In some embodiments, a snapshot consumer module 194 may discover and access snapshots 140 and 150 for one, two, or more different data sets 102.

In some embodiments, a snapshot consumer module 194 may bootstrap a local version of a data set 102 in a local memory by obtaining a most recent full snapshot 140 from the intermediate data store 120 to establish the local data set, and then obtaining and applying one or more incremental snapshots 150 that were generated and uploaded after the full snapshot 140 to bring the local data set up to date. In some embodiments, after bootstrapping the local data set, the snapshot consumer module 194 may monitor the intermediate data store 120 to detect new snapshots 140 or 150 for the data set, downloading and applying the new snapshots to the local data set to maintain a current state for the local data set that is close to the state of the primary data set 102 on the primary data store 104.

Figure 3A:
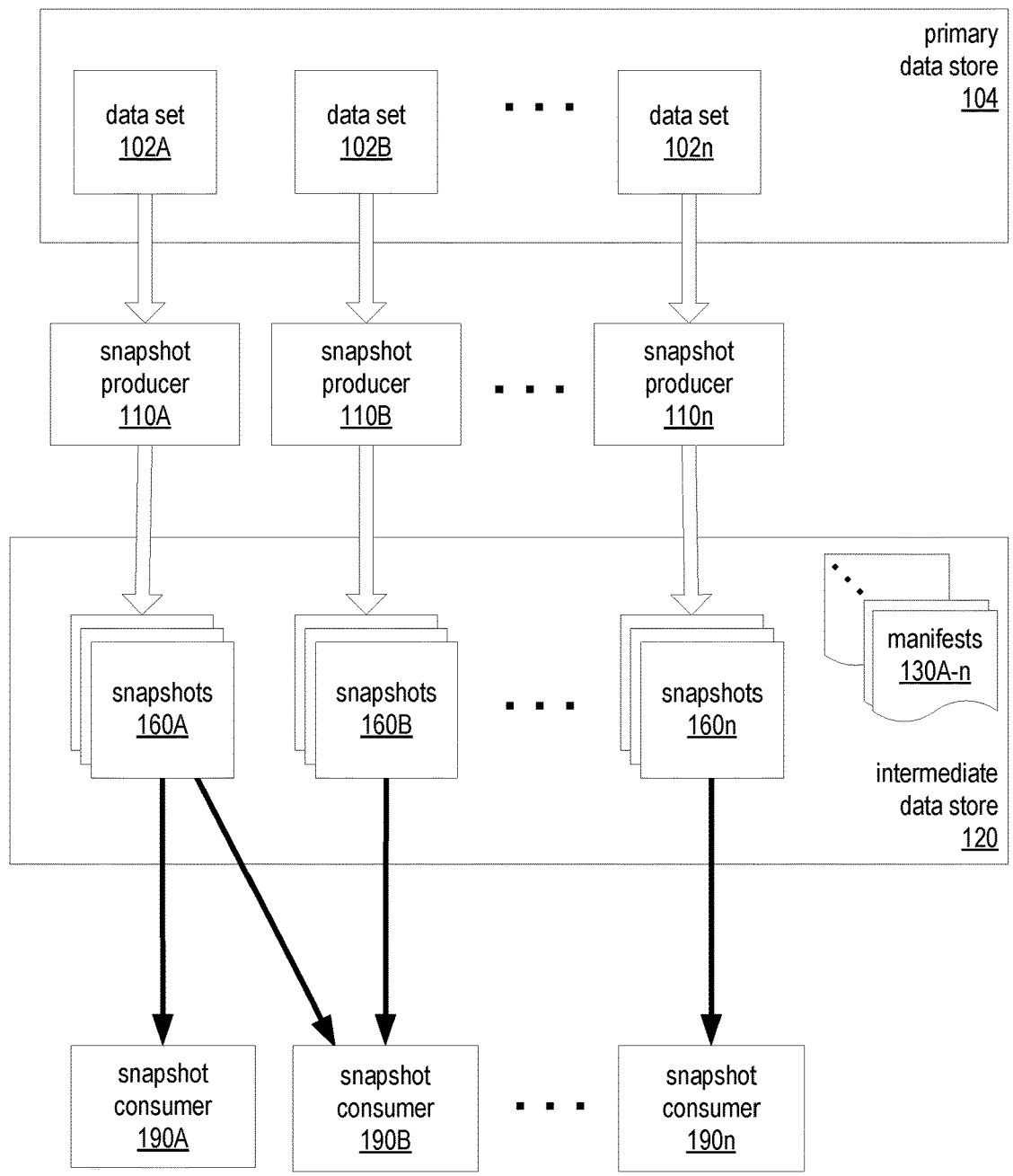
FIG. 3A is a block diagram illustrating multiple data sets, snapshot producers, and snapshot consumers in a bulk data distribution system, according to at least some embodiments.

FIG. 3A is a block diagram illustrating multiple data sets 102, snapshot producers 110, and snapshot consumers 190 in an example bulk data distribution system 100, according to at least some embodiments. A primary data store 104 may store a large data store, for example a relational database, that includes multiple data sets 110A-110n. For example, a merchant may operate one or more order fulfillment centers that receive and store items to locations in inventory, receive orders for items, retrieve the ordered items from locations in inventory, and ship the items to respective destinations. Each fulfillment center may maintain a large data store or database, for example a relational database, that includes data sets 110 for various aspects of the order fulfillment process including but not limited to inventory and picking data sets.

In some embodiments, there may be one snapshot producer 110A-110n for each data set 102A-102n in the primary data store 104. In some embodiments, a given snapshot producer 110 may generate and upload snapshots 160 of its corresponding data set 102 to an intermediate data store 120. In some embodiments, the snapshot producer 110 may periodically generate and upload full snapshots of its data set 102 to the intermediate data store 120, and may also generate and upload one or more incremental snapshots between the full snapshots either on a periodic schedule or when a change in data has been detected. For example, snapshot producer 110A may generate and upload snapshots 160A for data set 102A, snapshot producer 110B may generate and upload snapshots 160B for data set 102B, and so on.

In some embodiments, snapshot consumers 190A-190n may download snapshots 160A-160n from the intermediate data store 120 and use the snapshots 160 to establish and maintain local versions of primary data sets 102A-102n for access by data processing modules, processes, or applications that need access to the data. In some embodiments, one, two or more snapshot consumers 190 may consume snapshots 160 for a given data set 102. For example, as shown in FIG. 3A, snapshots 160n corresponding to data set 102n are consumed by snapshot consumer 190n, while snapshots 160A corresponding to data set 102A are consumed by both snapshot consumer 190A and 190B. In some embodiments, additional snapshot consumers 190 may be added for a given data set 102 without requiring additional snapshot producers 110 or adding any extra load on an existing snapshot producer 110. In some embodiments, a snapshot consumer 190 may consume snapshots 160 generated from two or more data sets 102. For example, as shown in FIG. 3A, snapshot consumer 190B consumes snapshots 160A and 160B corresponding to data sets 102A and 102B.

In some embodiments, the bulk data distribution system 100 may use snapshot manifests 130A-130n to record and retrieve information about snapshots 160A-160n. In some embodiments, a separate manifest 130 may be maintained for each data set 102A-102n in the primary data store 104. In some embodiments, snapshot producers 110A-110n may create and maintain the snapshot manifests 130A-130n. In some embodiments, snapshot consumers 190A-190n may access the snapshot manifests 130A-130n to locate, determine availability of, and get locations for obtaining snapshots 160A-160n for data set(s) 102A-102n from the intermediate data store 120. While FIG. 3A shows snapshot manifests 130A-130n stored in intermediate data store 120 with the snapshots 160A-160n, in some embodiments the snapshot manifests 130A-130n may be stored elsewhere, for example in other data storage systems that are accessible to both the snapshot producers 110A-110n and snapshot consumers 190A-190n.

In some embodiments, instead of having a separate snapshot producer 110 for each data set 102 in the primary data store 104, a single snapshot producer 110 may generate snapshots for two or more data sets 102. For example, in some embodiments, a snapshot producer 110 full snapshot process may periodically wake up, generate full snapshots 140 for two or more data sets 110, and then go back to sleep until time to generate new full snapshots 140 for the data sets 110.

Figure 3B:
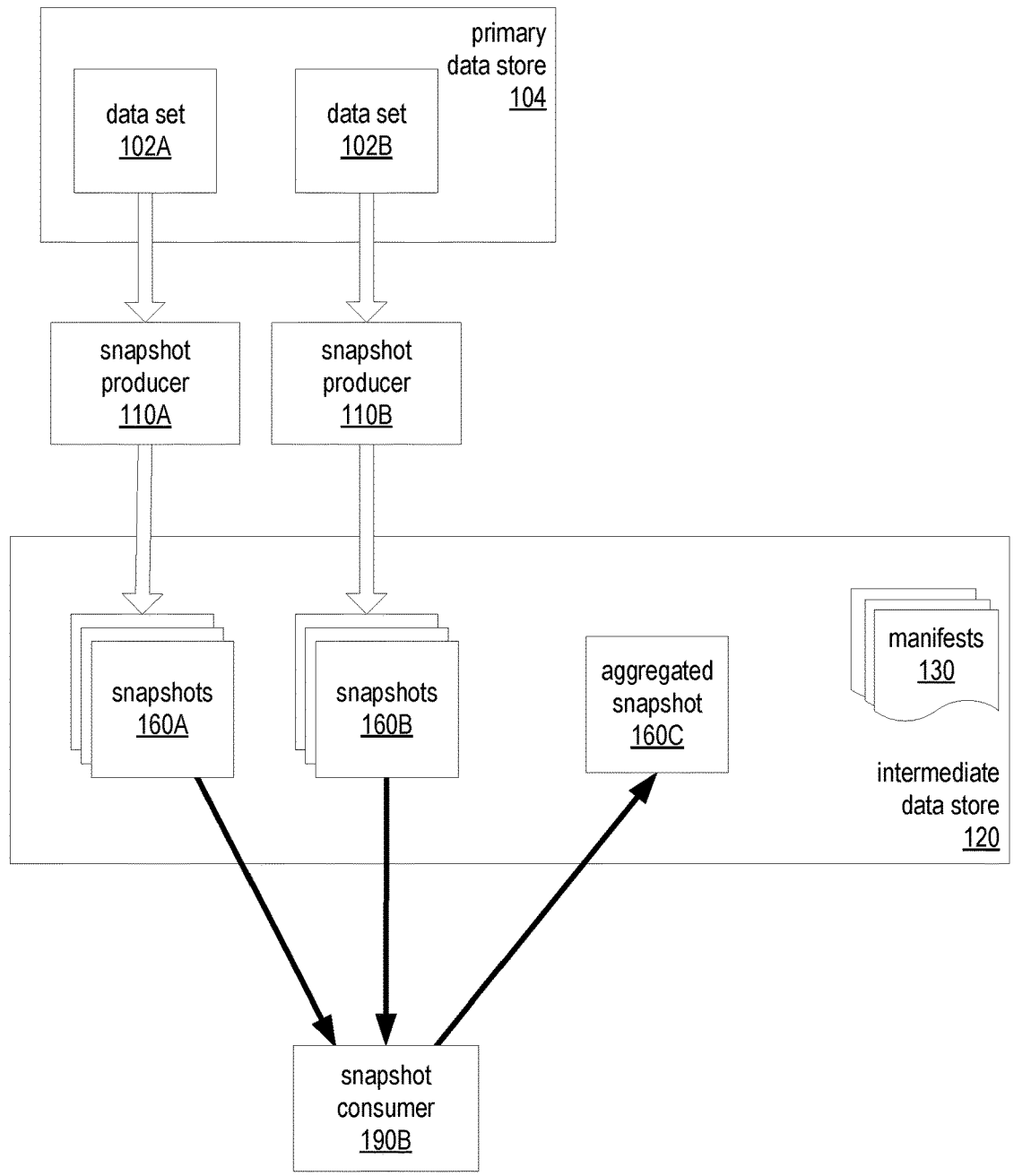
FIG. 3B is a block diagram illustrating aggregating snapshots from two or more data sets in a bulk data distribution system, according to at least some embodiments.

FIG. 3B is a block diagram illustrating aggregating snapshots from two or more data sets in a bulk data distribution system, according to at least some embodiments. In some embodiments, a snapshot consumer 190 may consume snapshots 160 generated from two or more data sets 102. For example, as shown in FIG. 3A, snapshot consumer 190B consumes snapshots 160A and 160B corresponding to data sets 102A and 102B. In some embodiments, a snapshot consumer 190 such as consumer 190B may download and aggregate snapshots 160 from two or more different data sets 102 into a single combined or aggregated snapshot 160. In some embodiments, an aggregated snapshot may be made available for access by other consumers 190 or data processing applications, for example via the intermediate data store 120. For example, as shown in FIG. 3B, snapshot consumer 190B may aggregate snapshots 160A and 160B from data sets 102A and 102B, and aggregate the snapshots into a single, combined snapshot 160C. In some embodiments, aggregating two or more snapshots 160 from different data sets 102 may involve obtaining a full snapshot of one of the data sets, establishing a local data set with that full snapshot, and then merging full snapshots from the one or more other data sets 102 with the local data set to generate an aggregated local data set. In some embodiments, a new snapshot may be generated from the aggregated local data set and uploaded to the intermediate data store 120 as an aggregated snapshot 160C for access by one or more other snapshot consumers 190. In some embodiments, the aggregated snapshot 160C may be periodically updated according to incremental snapshots from each of its component data sets 102. In some embodiments, a manifest 130 may be created and/or updated for the aggregated snapshot 160C.

Figure 3C:
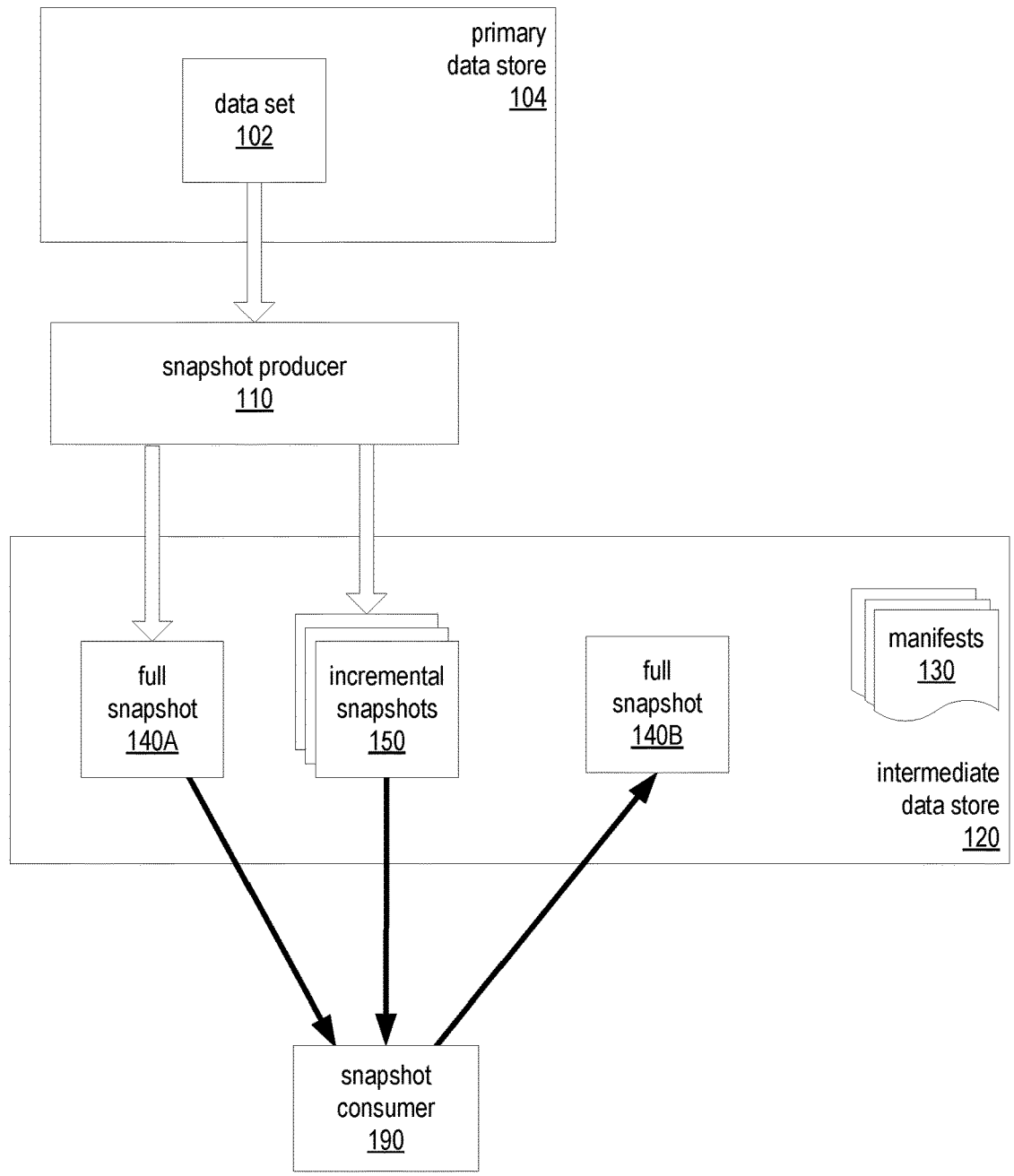
FIG. 3C is a block diagram illustrating aggregating incremental and full snapshots from a data set in a bulk data distribution system, according to at least some embodiments.

FIG. 3C is a block diagram illustrating aggregating incremental and full snapshots from a data set in a bulk data distribution system, according to at least some embodiments. As shown in FIG. 3C, in some embodiments, a snapshot consumer 190 may aggregate one or more incremental snapshots 150 of a data set 102 with a full snapshot 140A of the data set 102 to generate a new full snapshot 140B of the data set 102, and upload the full snapshot 140B to the intermediate data store 120 for access by one or more other snapshot consumers 190. In some embodiments, a manifest 130 may be created and/or updated for the full snapshot 140B.

Figure 4:
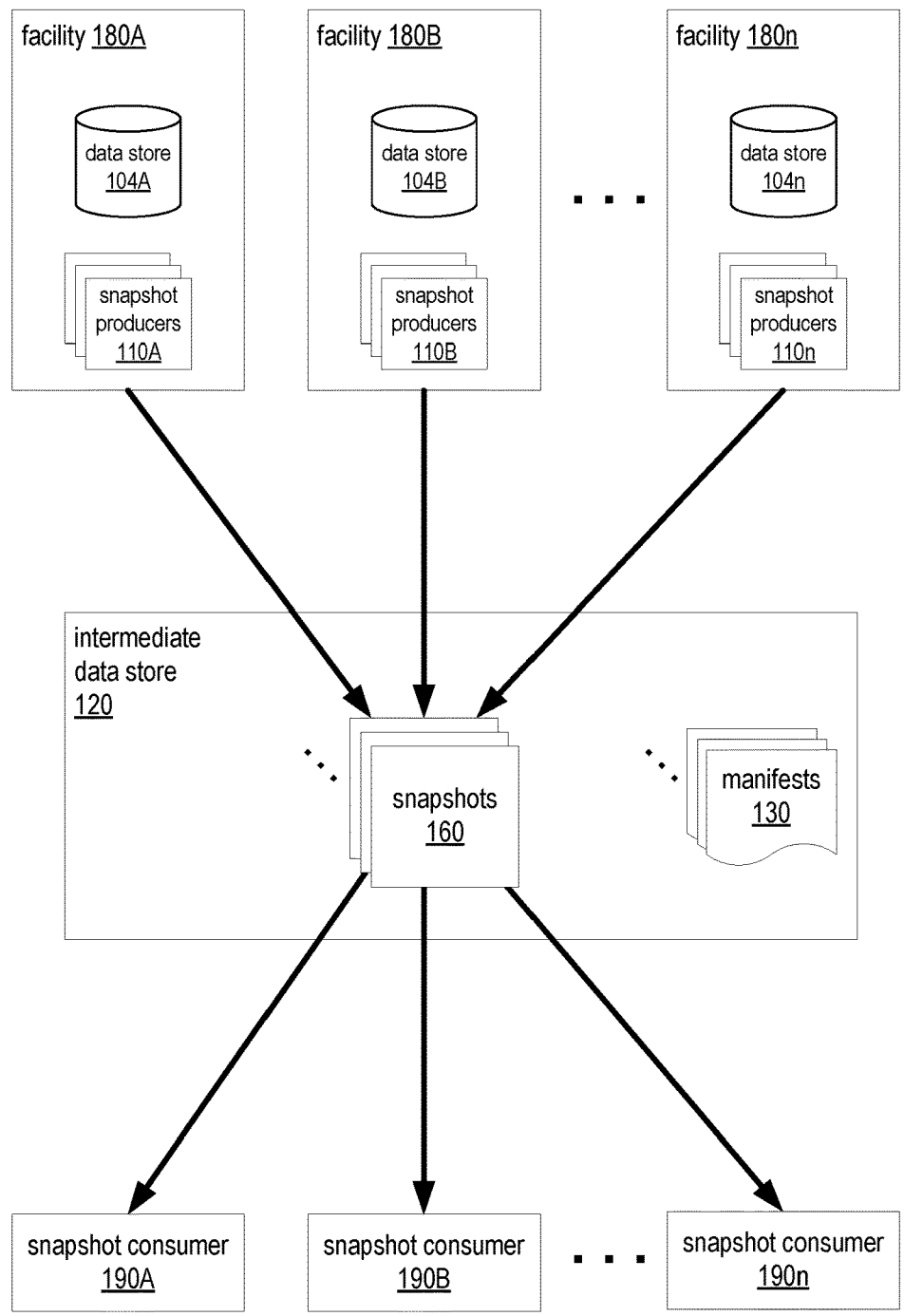
FIG. 4 is a block diagram illustrating multiple facilities participating in a bulk data distribution system, according to at least some embodiments.

FIG. 4 is a block diagram illustrating multiple facilities participating in a bulk data distribution system 100, according to at least some embodiments. An enterprise may include multiple facilities 180A-180n. For example, a merchant may operate two or more order fulfillment centers that each receive and store items to locations in inventory, receive orders for items, retrieve the ordered items from locations in inventory, and ship the items to respective destinations. Each facility 180A-180n may include a local network or networks, and each facility 180A-180n may maintain a primary data store 104 on the network, for example a relational database, that may include multiple data sets. For example, each of two or more fulfillment centers of a merchant enterprise may include a fulfillment center network and may maintain a data store 104 on the network that includes data sets for various aspects of the order fulfillment process within the fulfillment center including but not limited to inventory and picking data sets. One or more snapshot producers 110 may be implemented on the network of each facility 180. For example, facility 180A may implement a data store 104A and one or more snapshot producers 110A on a network local to facility 180A, facility 180B may implement a data store 104B and one or more snapshot producers 110B on a network local to facility 180B, and so on.

In some embodiments, one or more snapshot producers 110 in each facility 180 may generate and upload snapshots 160 of corresponding data sets from a respective data store 104 to an intermediate data store 120. For example, snapshot producers 110A in facility 180A may generate full and incremental snapshots from data sets in data store 104A, snapshot producers 110B may generate snapshots 160 from data sets in data store 104B, and so on. In some embodiments, the snapshot producers 110A-110n may use snapshot manifests 130 to record information about snapshots 160 uploaded to intermediate data store 120.

In some embodiments, snapshot consumers 190A-190n may download snapshots 160 from the intermediate data store 120 and use the snapshots 160 to establish and maintain local versions of primary data sets from data stores 104A-104n for access by data processing modules, processes, or applications that need access to the data. In some embodiments, snapshot consumers 190A-190n may access snapshot manifests 130 to locate, determine availability of, and get locations for obtaining snapshots 160 for particular data sets from data stores 110A-110n. In some embodiments, a snapshot consumer 190 may access one or more data sets from a given data store 104, or may access data sets from two or more of the data stores 104A-104n. In some embodiments, two or more data sets 102 accessed from a single data store 110 or data sets 102 from two or more data stores 110 may be combined or consolidated by a snapshot consumer 190 into a single local data set, store or cache. Thus, a snapshot consumer may download and consolidate data sets 102 from two or more of the facilities 180A-180n in some embodiments. Note that a given snapshot consumer 190 may be located on a network within one of the facilities 180A-180n, or may be located elsewhere.

Figure 5:
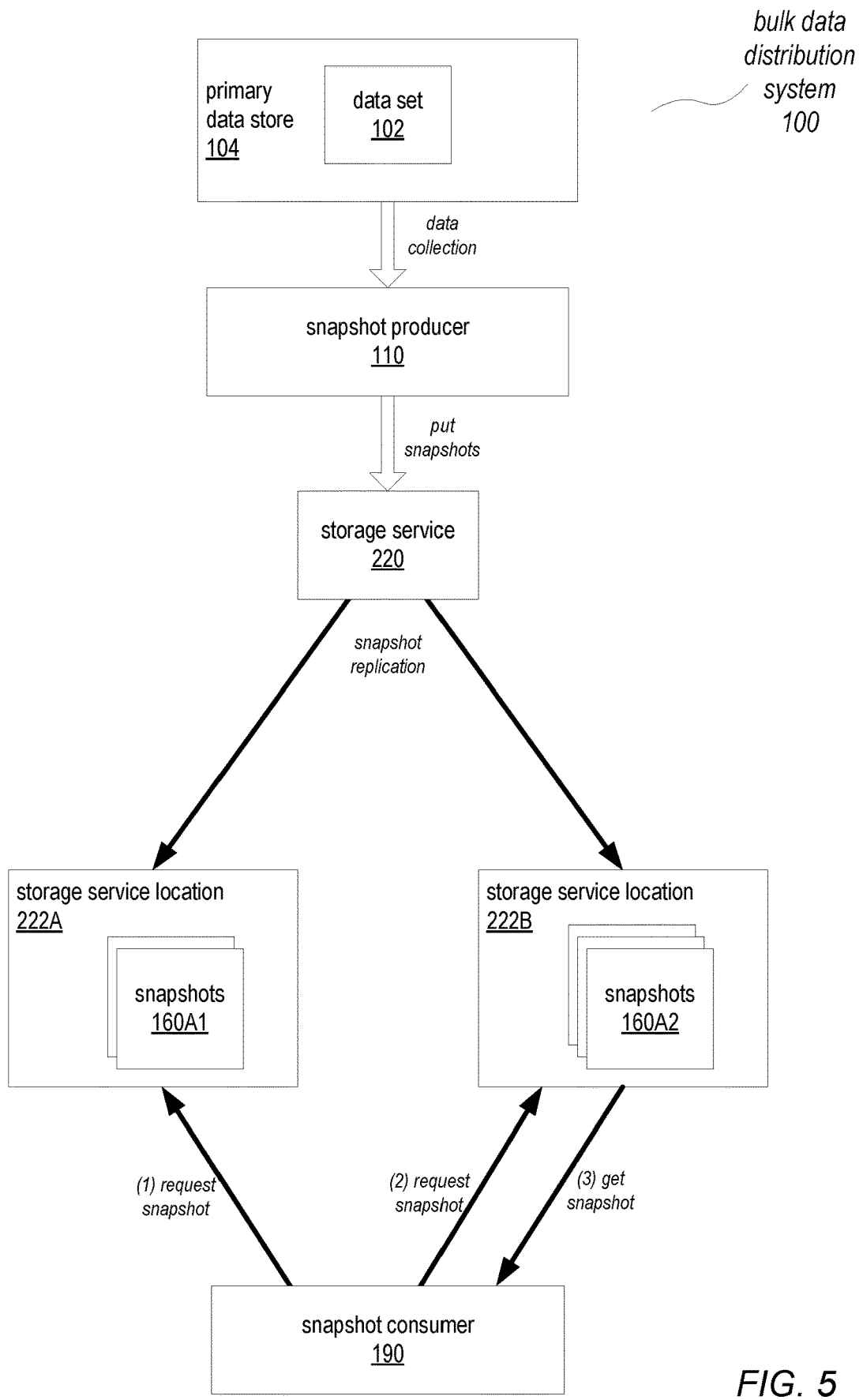
FIG. 5 is a block diagram illustrating replication of snapshots in a bulk data distribution system, according to at least some embodiments.

FIG. 5 is a block diagram illustrating replication of snapshots in a bulk data distribution system, according to at least some embodiments. In some embodiments, the intermediate data store may be implemented as a storage service 220, for example as an object storage service as illustrated in FIG. 11. A snapshot producer 110 may generate and upload snapshots 160A of a data set 102 to virtualized storage via the storage service 220. In some embodiments, the storage service 220 may replicate snapshots 160A to two or more different storage service locations 222A and 222B as snapshots 160A1 and 160A2, for example to different service provider networks or data centers implemented in different geographic zones or regions. A snapshot consumer 190 may access the snapshots 160A for the data set 102 from one or more of the storage service locations 222 to which the snapshots 160A are replicated. In some embodiments, the snapshot consumer 190 may access a replicated snapshot 160 from an alternative storage service location 222 if the snapshot 160 is not available at a primary storage service location 222 when requested. For example, in some embodiments, a given storage service location 222 may provide eventual consistency and not read-after-write consistency for new data writes as described in reference to the object storage model illustrated in FIG. 11. For example, in FIG. 5, storage service location 222A may only provide eventual consistency for writes, while storage service location 222B may provide read-after-write consistency. Thus, a most recent snapshot 160 that is indicated by a manifest as having been uploaded to location 222A may not yet be available from the location 222A when requested by a consumer 190 at (1). At (2), upon discovering that the snapshot is not accessible from storage service location 222A, the consumer 190 may request the snapshot 160 from a secondary location 222B as indicated by the manifest, and at (3) the snapshot 160 may be downloaded to the consumer 190.

Figure 6A:
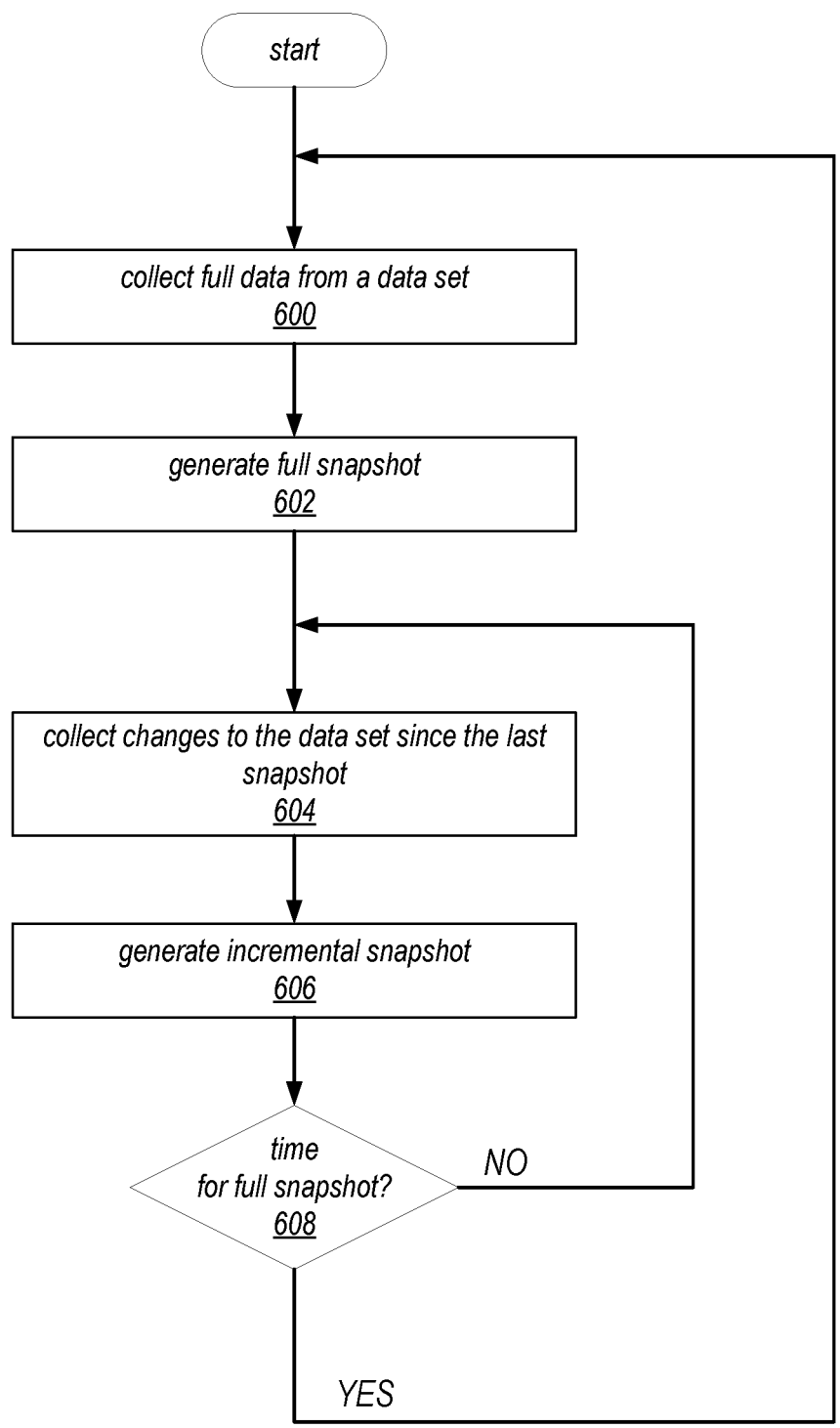
FIGS. 6A and 6B are flowcharts of methods for producing snapshots of data sets in a bulk data distribution system, according to at least some embodiments.
Figure 6B:
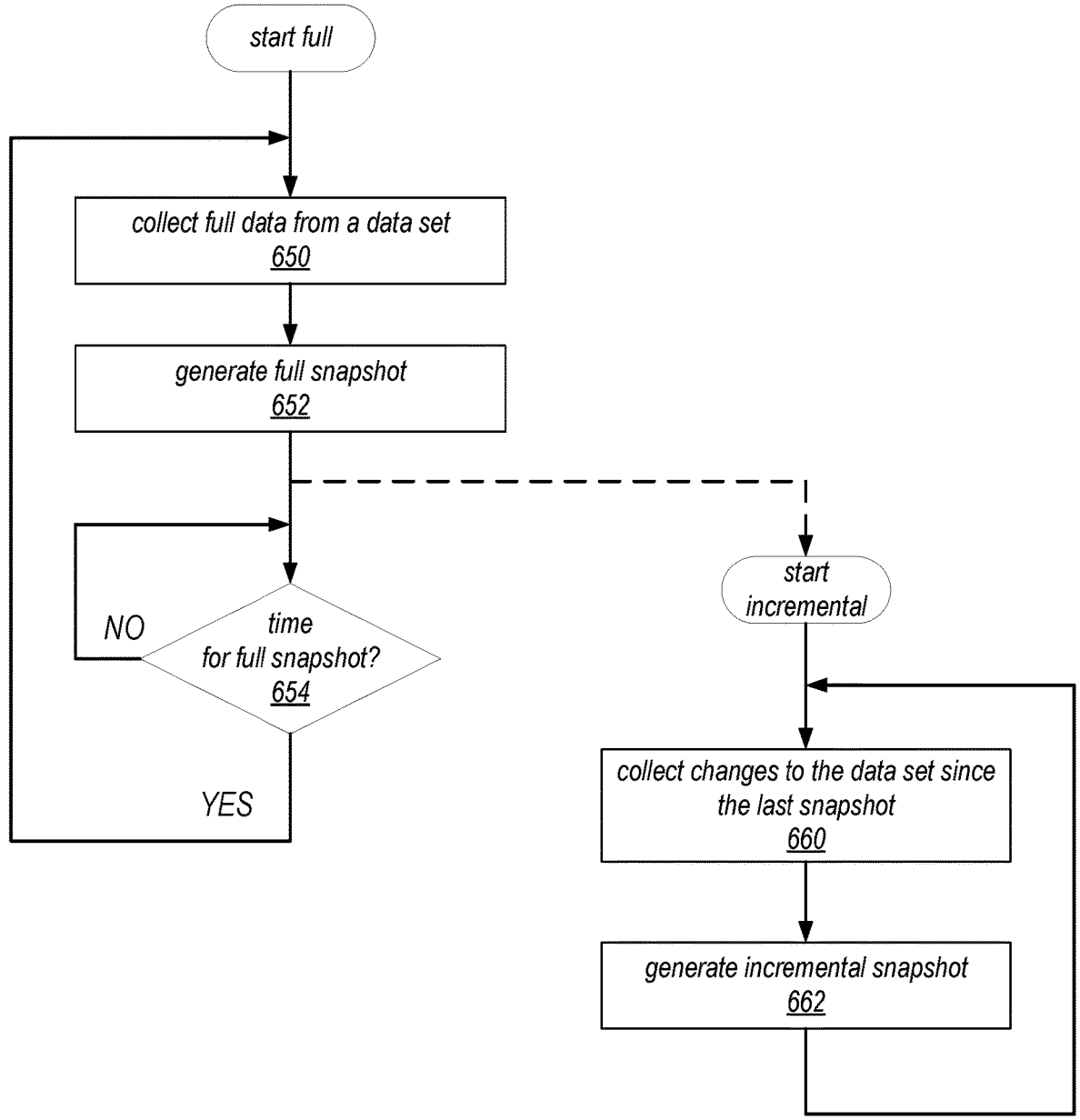

FIGS. 6A and 6B are flowcharts of methods for producing snapshots of data sets in a bulk data distribution system, according to at least some embodiments. The methods of FIG. 6A or 6B may, for example, be performed by a snapshot producer 110 as illustrated in FIG. 2. As shown in FIGS. 6A and 6B, in some embodiments, a snapshot producer may initially generate a full snapshot of a corresponding primary or production data set, and thereafter may generate full snapshots of the data set on a schedule, for example every ten minutes, once an hour, every six hours, or once a day. One or more incremental snapshots may be generated for the data set between the full snapshots. For example, in some embodiments, an incremental snapshot may be generated once a minute, once every five minutes, or once an hour.

FIG. 6A is a flowchart of one embodiment of a method for producing snapshots of data sets in a bulk data distribution system that may be implemented by a snapshot producer process. A snapshot of a data set may be broadly defined as a capture of the state of a data set at a particular point in time. In some embodiments, a snapshot producer process may capture a full snapshot of a data set at a specified interval, for example every ten minutes, once an hour, or every six hours. A full snapshot of a data set captures the consistent state of the entire data set at a particular point in time. As indicated at 600 of FIG. 6A, a snapshot producer may collect data from a corresponding data set for the full snapshot. For example, in some embodiments, the snapshot producer may query a database in a primary data store to obtain the current content of the entire data set at a particular point in time. As another example, in some embodiments, the snapshot producer may generate a read-only copy of the data set at a particular point in time from which a full snapshot may be generated. In some embodiments, the snapshot producer may locally store or cache the collected data. In some embodiments, to ensure that a consistent state of the data set is captured at a particular point in time, the data set may be temporarily locked, or write access to the data set may be temporarily blocked to the data set, while the data for the full snapshot is being collected so that other processes do not change the data in the data set during the collection period.

As indicated at 602 of FIG. 6A, once the data for the full snapshot has been collected from the primary data set, the snapshot producer may generate the full snapshot of the data set. In some embodiments, generating a full snapshot may include creating the full snapshot from the collected data and uploading the full snapshot to the intermediate data store. In some embodiments, the full snapshot may be generated according to a data format that is common across snapshot producers and data sets, for example a JavaScript Object Notation (JSON) data format. In some embodiments, the full snapshot may be compressed prior to uploading to the intermediate data store. In some embodiments, the full snapshot may be encrypted prior to uploading to the intermediate data store. In some embodiments, the snapshot producer may create a manifest, or update an existing manifest, for the data set to indicate the new full snapshot of the data set.

In some embodiments, once an initial full snapshot has been generated, the snapshot producer may begin generating incremental snapshots. As previously mentioned, the snapshot producer may collect change data according to an incremental interval or period (e.g., one minute), and generate incremental snapshots according to the incremental period. Note that an incremental snapshot process of the snapshot producer may continuously collect change data for the data set, generating incremental snapshots from the collected data at the incremental interval or period (e.g., once a minute).

As indicated at 604 of FIG. 6A, the snapshot producer may collect changes to the data set since the last snapshot (which may be either a full or an incremental snapshot). For example, in some embodiments, the snapshot producer may monitor accesses to the primary data store for the corresponding data set to detect and record changes (additions, deletions, modifications) made to the data set. As another example, in some embodiments, the primary data store may maintain a change log for the data set, and the snapshot producer may access the change log to determine changes in the data set since the last snapshot. As another example, in some embodiments, the primary data store may implement versioning for data in the data sets, and the snapshot producer may use the versioning of the data to detect changes to the corresponding data set, for example by comparing versions of the data in the primary data set to versions of data from the data set maintained in a local cache of the snapshot producer.

As indicated at 606 of FIG. 6A, once the data for an incremental snapshot is collected, the snapshot producer may generate the incremental snapshot of the data set. In some embodiments, generating an incremental snapshot may include creating the incremental snapshot from the collected data and uploading the incremental snapshot to the intermediate data store. In some embodiments, the incremental snapshot may be generated according to a data format that is common across snapshot producers and data sets, for example a JavaScript Object Notation (JSON) data format. In some embodiments, the incremental snapshot may be compressed prior to uploading to the intermediate data store. In some embodiments, the incremental snapshot may be encrypted prior to uploading to the intermediate data store. In some embodiments, the snapshot producer may create or update a manifest for the data set to indicate the new incremental snapshot of the data set.

At 608 of FIG. 6A, after the incremental snapshot has been generated, if it is not time to generate a full snapshot, the method may return to element 606 to begin generating the next incremental snapshot. Again note that the snapshot producer may continuously collect change data for the data set, generating incremental snapshots from the collected data at the incremental interval or period. Otherwise, if it is time to generate a full snapshot, the method may return to element 600 to begin the next full snapshot.

FIG. 6B is a flowchart of an alternative embodiment of a method for producing snapshots of data sets in a bulk data distribution system. In some embodiments, a snapshot producer may implement a full snapshot component or process that generates full snapshots, and an incremental snapshot component or process that generates incremental snapshots. For example, in some embodiments, a full snapshot process may be scheduled to wake up at a specified interval, for example every ten minutes, once an hour, or every six hours, collect data for a full snapshot from the data set on the primary data store as indicated at 650 of FIG. 6B, generate a full snapshot from the collected data as indicated at 652 of FIG. 6B, and then go back to sleep until time for the next full snapshot to be captured as indicated at 654.

As indicated by the dashed line in FIG. 6B, in some embodiments, the incremental snapshot process may be initiated in response to a first full snapshot being generated for the data set. The incremental snapshot process may monitor and capture change data for the data set since a last (full or incremental) snapshot as indicated at 660 of FIG. 6B, and generate incremental snapshots for the data set as indicated at 662 according to an incremental interval or period, for example once a minute, once every five minutes, or once an hour.

While not shown in FIGS. 6A and 6B, in some embodiments, instead of generating and uploading an incremental snapshot for a data set at each incremental snapshot interval (e.g., once a minute), a snapshot producer may be configured to only generate an incremental snapshot for the data set if the data set has changed. For example, in some embodiments, the snapshot producer may compare the current state of the primary data set to a most recent snapshot of the data set to determine if the data set has changed, and generate a new incremental snapshot only upon determining that the data set has changed. Other methods of detecting change in a data set may be used in other embodiments.

Referring to the methods in FIGS. 6A and 6B, when generating incremental snapshots of a data set at an incremental interval, one or more records in the data set may be deleted or deactivated between snapshots. If these deletes are not indicated in an incremental snapshot, then a process accessing the snapshot data may assume that the deleted records are still active in the data set. Thus, in some embodiments, indications of deleted or missing records may be included in incremental snapshots to signal to processes that consume the incremental snapshots that the respective records are deleted.

Figure 7:
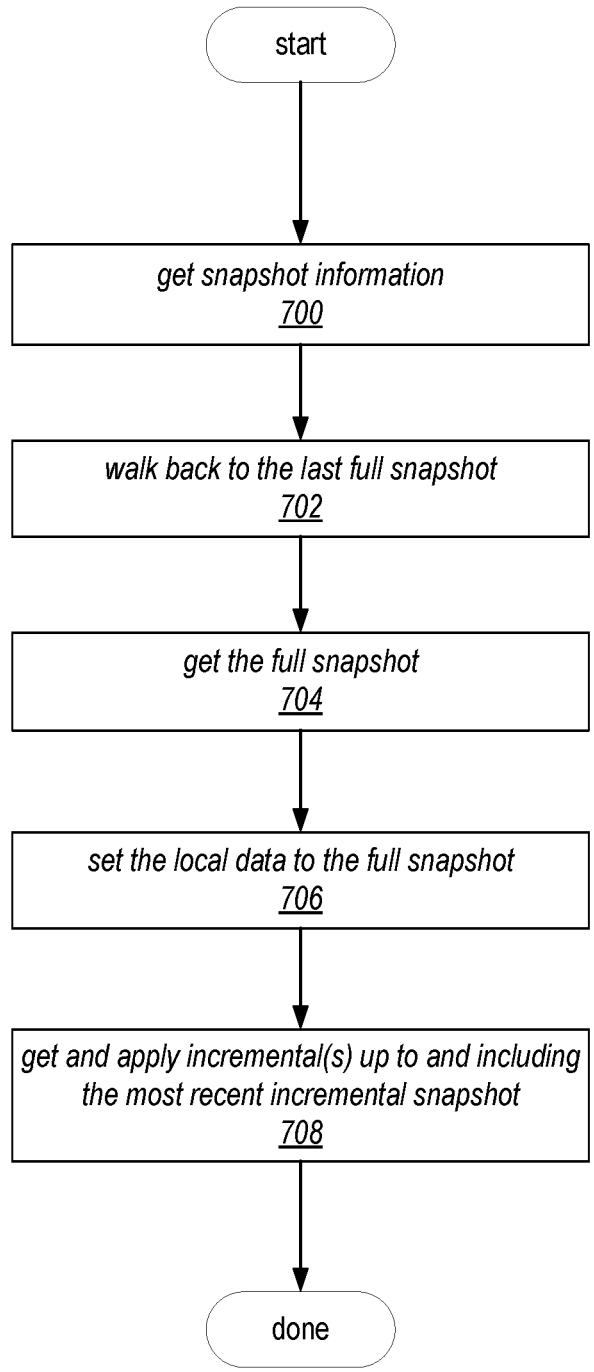
FIG. 7 is a flowchart of a method for bootstrapping a data consumer in a bulk data distribution system, according to at least some embodiments.

FIG. 7 is a flowchart of a method for bootstrapping a data consumer in a bulk data distribution system, according to at least some embodiments. The method of FIG. 7 may, for example, be performed by a snapshot consumer 190 as illustrated in FIG. 2. In some embodiments, a snapshot consumer may bootstrap a local version of a data set by obtaining a most recent full snapshot from the intermediate data store to establish the local data set, and then obtaining and applying one or more incremental snapshots that were generated and uploaded after the full snapshot to bring the local data set up to date.

As indicated at 700 of FIG. 7, the snapshot consumer may get snapshot information for the data set. For example, in some embodiments, the snapshot producer for the data set may create and update manifests for the data set to indicate new full and/or incremental snapshots of the data set when generated and uploaded to the intermediate data store, and the snapshot consumer may access the manifests for the data set to obtain the snapshot information for the data set. A snapshot manifest for a data set may, for example, identify and indicate locations in the intermediate data store of one or more full snapshots for the data set, and of one or more incremental snapshots for the data set. For example, date and time stamps may be used to identify and order full and incremental snapshots for a data set, and universal resource locators (URLs) may be used to indicate the locations of the snapshots in the data store. In some embodiments, in addition to location information, a snapshot manifest may include other metadata for each snapshot. For example, in some embodiments, a snapshot manifest may include a hash of each snapshot (e.g., an MD5 128-bit hash). In some embodiments, sequence identifiers may be included for incremental snapshots that may be used to determine the order in which the incremental snapshots should be processed.

As indicated at 702 of FIG. 7, the snapshot consumer may use the snapshot information to locate a most recent full snapshot. In some embodiments, the snapshot consumer may identify a most recent snapshot of the data set from the obtained information and, if the most recent snapshot is an incremental snapshot, walk back in time through the snapshot information until locating the most recent full snapshot.

As indicated at 704 of FIG. 7, once the most recent full snapshot has been identified, the snapshot consumer may get the most recent full snapshot from the location indicated in the snapshot information, for example from a URL indicated in a snapshot manifest for the data set.

As indicated at 706 of FIG. 7, the snapshot consumer may set a local version of the data set to the most recent full snapshot that was obtained at 704. In some embodiments, the snapshot may be encrypted and/or compressed, and thus the snapshot consumer may decrypt and/or decompress the snapshot as necessary. The local data set may be stored or cached to a local memory or storage device that is accessible to one or more data processing modules or applications.

As indicated at 708 of FIG. 7, the snapshot consumer may get and apply one or more incremental snapshots for the data set up to and including the most recent incremental snapshot to the local data set to bring the local data set up to date. In some embodiments, the snapshot consumer may walk forward in time through the snapshot information from the identified most recent full snapshot to the most recent incremental snapshot, applying each incremental snapshot to the local data set in chronological order as indicated by the snapshot information.

In some embodiments, after bootstrapping the local data set as indicated in FIG. 7, the snapshot consumer may continue to monitor the snapshot information (e.g., the snapshot manifests) for the data set to detect new full or incremental snapshots for the data set, downloading and applying the new snapshots to the local data set to maintain a current state for the local data set that is close to the state of the primary data set on the primary data store.

Figure 8:
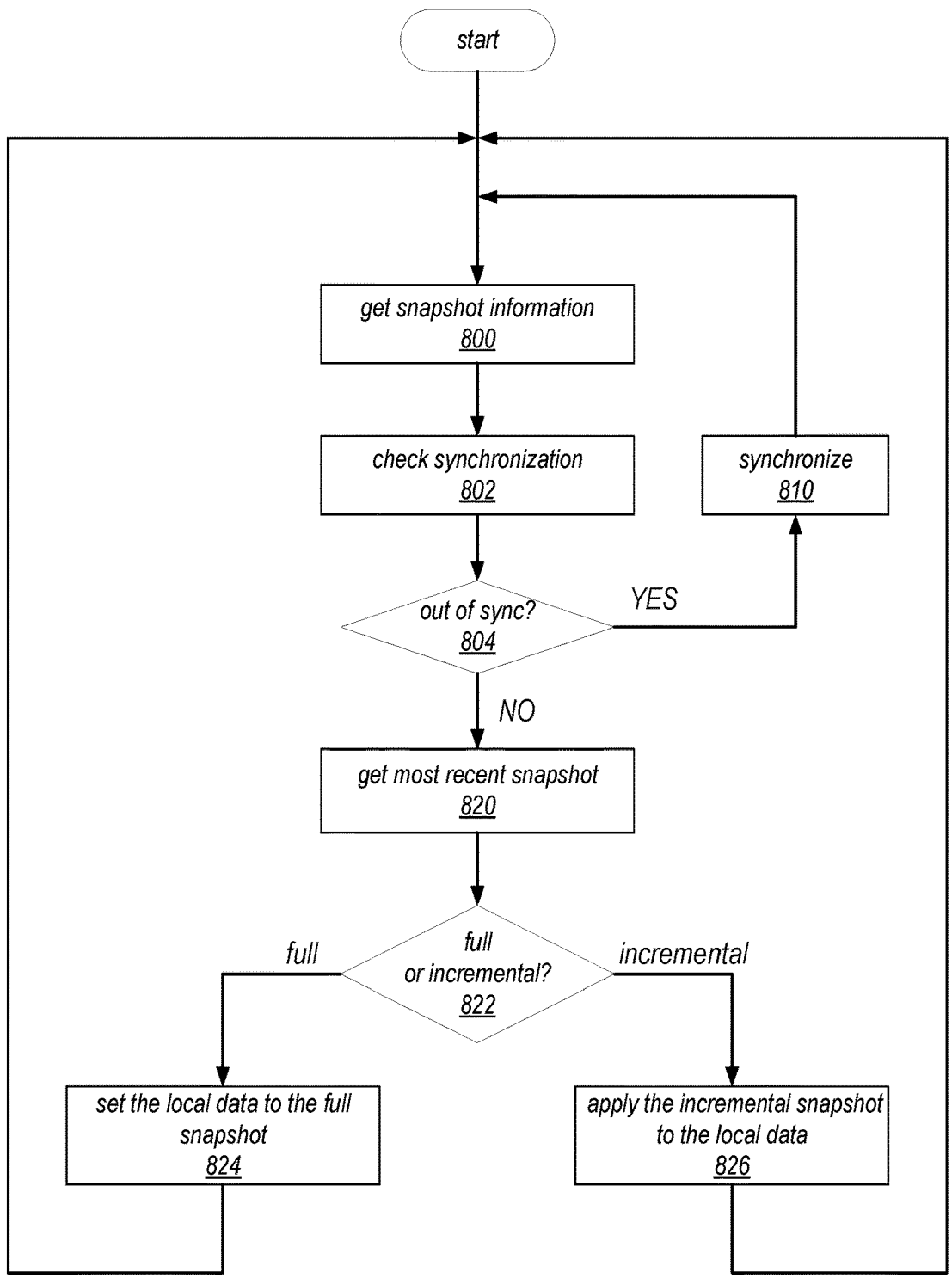
FIG. 8 is a flowchart of a method for consuming snapshots in a bulk data distribution system, according to at least some embodiments.

FIG. 8 is a flowchart of a method for consuming snapshots in a bulk data distribution system, according to at least some embodiments. The method of FIG. 8 may, for example, be performed by a snapshot consumer 190 as illustrated in FIG. 2. The method of FIG. 8 may, for example, be performed after bootstrapping a local data set according to the method as illustrated in FIG. 7.

As indicated at 800 of FIG. 8, a snapshot consumer may get snapshot information for a data set. For example, in some embodiments, the snapshot producer for the data set may create and update manifests for the data set to indicate new full and/or incremental snapshots of the data set when generated and uploaded to the intermediate data store, and the snapshot consumer may access the manifests for the data set to obtain the snapshot information for the data set.

As indicated at 802 of FIG. 8, the snapshot consumer may check synchronization of the local data set according to the obtained snapshot information. For example, the snapshot consumer may check the snapshot information to determine if any full or incremental snapshots generated by the snapshot producer have been missed. For example, incremental snapshots may be labeled with sequence numbers, and the snapshot consumer may check the sequence numbers for incremental snapshots as consumed to determine if the snapshot consumer is out of synchronization with the snapshot producer. At 804, if the snapshot consumer is out of synchronization with the snapshot producer, then the snapshot consumer may synchronize as indicated at 810. For example, in some embodiments, to synchronize, the snapshot consumer may perform a bootstrapping method as indicated in FIG. 7 to get the local data set back in synchronization with the snapshots. After synchronization at 810, the method may return to element 800 to determine if there is an update to the snapshot information.

At 804, if the snapshot consumer is not out of synchronization with the snapshot producer, then at 820 the snapshot consumer may get a most recent snapshot indicated by the snapshot information. At 822, if the most recent snapshot is a full snapshot, then at 824 the snapshot consumer may set the local version of the data set to the most recent full snapshot that was obtained at 820. At 822, if the most recent snapshot is an incremental snapshot, then at 826 the snapshot consumer may get and apply the incremental snapshot to the local data set to bring the local data set up to date. In some embodiments, the full and/or incremental snapshots may be encrypted and/or compressed, and thus the snapshot consumer may decrypt and/or decompress the snapshots as necessary before applying the snapshots to the local data.

Figure 9:
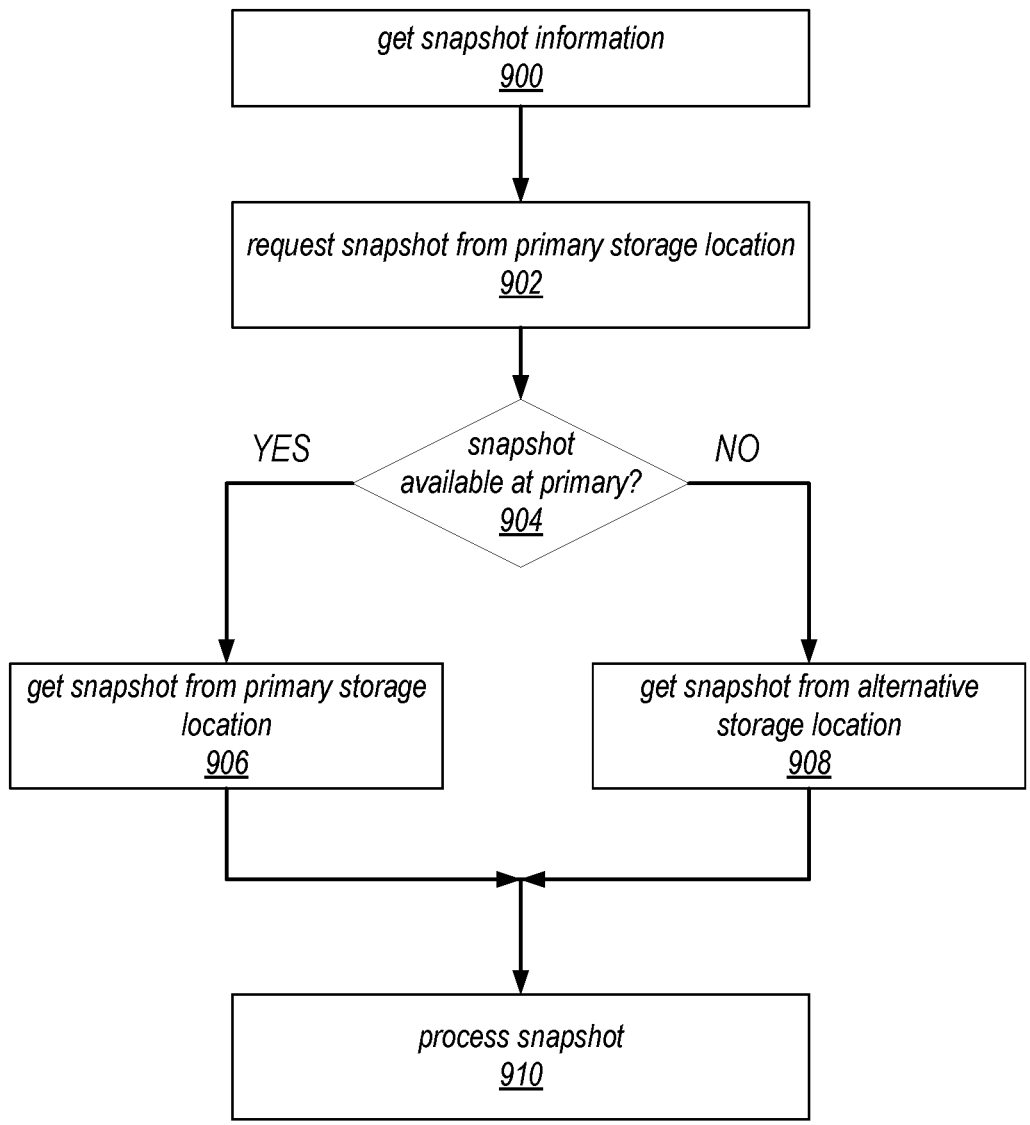
FIG. 9 is a flowchart of a method for obtaining snapshots in a bulk data distribution system, according to at least some embodiments.

FIG. 9 is a flowchart of a method for obtaining snapshots in a bulk data distribution system, according to at least some embodiments. The method of FIG. 9 may, for example, be performed by a snapshot consumer 190 as illustrated in FIG. 2. In some embodiments, the intermediate data store used in the bulk data distribution system may replicate snapshots to two or more different storage locations, for example to different networks or data centers implemented in different geographic zones or regions. In some embodiments, a given storage location may provide eventual consistency and not read-after-write consistency for new data writes, for example as described in reference to the object storage model illustrated in FIG. 11. Thus, a most recent snapshot that is indicated by a manifest as having been uploaded to a given storage location may not yet be available from the location when requested by a snapshot consumer. In some embodiments, since the snapshots are replicated to two or more different storage locations by the intermediate storage service, the snapshot consumer may request the snapshot from a secondary storage location as indicated by the manifest.

As indicated at 900 of FIG. 9, the snapshot consumer may get snapshot information for the data set. For example, in some embodiments, the snapshot producer for the data set may create and update manifests for the data set to indicate new full and/or incremental snapshots of the data set when generated and uploaded to the intermediate data store, and the snapshot consumer may access the manifests for the data set to obtain the snapshot information for the data set. A snapshot manifest for a data set may, for example, identify and indicate locations in the intermediate data store of one or more full snapshots for the data set, and of one or more incremental snapshots for the data set. For example, date and time stamps may be used to identify full and incremental snapshots for a data set, and universal resource locators (URLs) may be used to indicate the locations of the snapshots in the data store. In some embodiments, as described above, the intermediate data store may replicate snapshots to two or more storage locations. In these embodiments, the snapshot manifests may indicate two or more storage locations to which a given snapshot may be replicated, for example as URLs directed to the given storage locations. In some embodiments, one of the storage locations may be indicated as a primary storage location.

As indicated at 902, the snapshot consumer may request a full or incremental snapshot from a primary storage location as indicated by the manifest. At 904, if the requested snapshot is available at the primary storage location, then the snapshot is obtained from the primary storage location at 906 and processed (e.g., application to the local data set) at 910. At 904, if the requested snapshot is not available at the primary storage location, then the snapshot is obtained from an alternative or secondary storage location as indicated at 908, and processed (e.g., applied to the local data set) at 910.

While FIG. 9 describes the snapshot consumer as determining a secondary storage location from the manifest, in some embodiments the intermediate data store may handle switching from a primary to a secondary storage location to satisfy requests for snapshots in cases where a snapshot is not available at the primary storage location when requested by a snapshot consumer.

Example Service Provider Network Environment

FIG. 10 illustrates an example service provider network environment in which embodiments of methods and apparatus for distributing bulk data may be implemented. A service provider may provide one or more services via which clients, for example an enterprise that operates one or more production networks 1800, may provision, manage, and operate virtualized resources including virtualized computation and storage resources. In some embodiments, virtualized storage resources may be implemented for a client on storage hardware on the provider network 1880 that may be shared with other client(s). Virtualized data store technology may be used in various embodiments to provide different types of data storage and storage services for clients. For example, an object storage service 1882 may provide general, unstructured data object-based storage 1880 to clients via which the clients may store and retrieve arbitrary types of data objects. In some embodiments, client(s) may interact with object storage service 1882 via one or more application programming interfaces (API(s) 1884) to provision, manage, and access storage resources on provider network 1880. As shown in FIG. 10, an object store 1886 provided by the object storage service 1882 may, for example, be used to store full and incremental snapshots 1890 as described herein. While not shown in FIG. 10, in some embodiments, object store 1886 may also store snapshot manifests as described herein. FIG. 11 illustrates an example embodiment of an unstructured object storage model for providing virtualized storage resources to clients as a service that may be used in some embodiments. As another example, not shown in FIG. 10, a data storage service, for example a database storage service provided by the service provider or by some other entity, may provide a structured data model (e.g., a database model) to the clients for storing and retrieving structured data including but not limited to snapshots 1890 and snapshot manifests as described herein.

In the example network environment shown in FIG. 10, an enterprise may operate one or more enterprise networks 1800, for example production networks in one or more fulfillment centers operated by a merchant enterprise. A given network 1800 may maintain a data store or database, for example a relational database, that includes one or more data sets 1810. For example, a fulfillment center may maintain a database that includes data sets 1810 for various aspects of the order fulfillment process. One or more snapshot producer systems 1820 may collect data from data sets 1810 to generate full and incremental snapshots and store the snapshots 1890 to object store 1886 via object storage service 1882, for example according to the method as illustrated in FIG. 6A or 6B. One or more snapshot consumer systems 1830 may access the snapshots 1890 from the object store 1886 via the object storage service 1882 to establish or update a local version of at least one data set 1810 for access by one or more applications or processes, for example according to the methods as illustrated in FIGS. 7 and 8. While not shown in FIG. 10, in some embodiments, snapshot producer systems 1820 may maintain snapshot manifests that, for example, indicate locations of snapshots 1890 (including but not limited to most recent full and incremental snapshots) in the object store 1886 (for example, as universal resource locators (URLs)), and snapshot consumer systems 1830 may access the snapshot manifests to determine availability of and locations for obtaining full and/or incremental snapshots 1890 from the object store 1886. The snapshot manifests may be, but are not necessarily, stored in object store 1886.

While FIG. 10 shows snapshot consumer system(s) 1830 on enterprise network(s) 1800 with snapshot producer system(s) 1820, note that a snapshot consumer system 1830 may be located elsewhere, for example on another network. In some embodiments, the object storage service 1882 may replicate the snapshots 1890 to different storage service locations as illustrated in FIG. 5, for example, to different provider networks 1880 implemented in different geographic zones or regions, and a snapshot consumer system 1830 may for example access the snapshots 1810 from the storage service locations using a method as described in FIG. 9. For example, in some embodiments, one or more of the storage service locations may provide eventual consistency and not read-after-write consistency for new data writes as described in reference to the object storage model illustrated in FIG. 11, and a snapshot consumer system 1830 may access a replicated snapshot 1810 from an alternative storage service location if not available at a primary storage service location as described in FIG. 9.

Example Object Storage Service

An example embodiment of an unstructured object storage model for providing virtualized storage resources to clients as a service, such as a web service, is illustrated in FIG. 11. In the illustrated model, storage service interface 1910 is provided as a client-facing interface to object storage service 1940. Storage service interface 1910 may, for example, be implemented as, or alternatively may include, an application programming interface (API). According to the model presented to a client 1905 by interface 1910, the storage service may be organized as an arbitrary number of buckets 1920a-n accessible via interface 1910. Each bucket 1920 may be configured to store an arbitrary number of objects 1930a-n, which in turn may store data specified by a client 1905 of the storage service 1940. One or more clients 1905 may submit requests to the storage service interface to store, retrieve, and, as described in more detail below, perform one or more operations on data object 1930. Storage service interface may provide responses 1908 to the requests, which may include acknowledgements and/or retrieved data, for example. Generally, in addition to storage and retrieval of data objects, the requests or commands that the storage service 1940 may perform may include commands that modify or update data within the storage service 1940. In this way, the clients 1905 are not burdened with removing the data from the storage service 1940, performing the operations, and then returning the modified data to the storage service. This configuration may save network bandwidth and processing resources for the clients 1905, for example. In some embodiments, the object storage service 1940 may be configured to internally replicate data objects for data redundancy and resiliency purposes.

In some embodiments storage service interface 1910 may be configured to support interaction between the storage service 1940 and its client(s) 1905 according to a web services model. For example, in one embodiment, interface 1910 may be accessible by clients as a web services endpoint having a Uniform Resource Locator (URL) to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

Data Consistency Models

In some embodiments, an object storage service 1940 may provide read-after-write consistency for new data objects 1930 when stored to the buckets 1920. Read-after-write consistency for new objects 1930 means that immediately after a write operation for a new object 1930, the service 1940 guarantees that the object 1930 will be returned in response to a read operation. However, in some embodiments, an object storage service 1940 may not guarantee that a new data object 1930 will be immediately available for reads after a write operation. These embodiments thus provide eventual consistency for new data objects 1930, rather than read-after write consistency.

In some embodiments, an object storage service 1940 may provide eventual consistency for updates of existing objects 1930 in the buckets 1920. After an update operation is performed on an existing data object 1930, it may take some period of time, generally seconds or minutes but possibly even hours or days, for the change to propagate to all instances of the data object 1930. Thus, in some embodiments, the object storage service 1940 may not guarantee that an access of a data object 1930 stored in the storage service 1940 will always return a latest or most recent version of the data object 1930. This property of a storage service such as object storage service 1940 may be referred to as eventual consistency, as a modified data object 1930 is generally guaranteed to be only eventually consistent across all instances.

Illustrative System

In at least some embodiments, a computing device that implements a portion or all of the methods and apparatus for distributing bulk data as described herein may include a general-purpose computer system that includes or is configured to access one or more computer-accessible media, such as computer system 2000 illustrated in FIG. 12. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), dynamic RAM (DRAM), synchronous dynamic RAM (SDRAM), nonvolatile/Flash-type memory, or any other type of memory. In the illustrated embodiment, program instructions and data implementing one or more desired functions, such as those methods, techniques, and data described above for distributing bulk data, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 11, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 11 for implementing embodiments of methods and apparatus for distributing bulk data. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices that implement one or more consumer modules, wherein a given consumer module, when implemented by the one or more computing devices, cause the one or more computing devices to:
access, by the consumer module, a manifest that is stored at an intermediate data store to determine a location, at the intermediate data store, of a full snapshot of a data set of a primary data store and to determine another location, at the same intermediate data store, of an incremental snapshot of the data set of the primary data store,
wherein the full snapshot at the location of the intermediate data store captures a state of the data set of the primary data store at a point in time and the incremental snapshot at the other location of the same intermediate data store captures changes to the state of the data set of the primary data store since the full snapshot of the data set;
based on the determination, by the consumer module, of the location of the full snapshot and the other location of the incremental snapshot indicated by the manifest that is stored at the intermediate data store, obtain, by the consumer module from the intermediate data store:
the full snapshot of the data set of the primary data store from the location of the intermediate data store, and the incremental snapshot of the data set of the primary data store from the other location of the same intermediate data store; and establish, by the consumer module, a local version of the data set of the primary data store according to the full snapshot of the data set and the incremental snapshot of the data set that are both obtained by the consumer module from the same intermediate data store, wherein the local version of the data set is stored at a snapshot consumer system.

2. The system as recited in claim 1, wherein to establish the local version of the data set of the primary data store, the consumer module, when implemented by the one or more computing devices, cause the one or more computing devices to:

apply the incremental snapshot to the full snapshot of the data set to establish the local version of the data set of the primary data store.

3. The system as recited in claim 1, wherein to establish the local version of the data set of the primary data store, the consumer module, when implemented by the one or more computing devices, cause the one or more computing devices to:

locally store the full snapshot as a previous local version of the data set of the primary data store; and subsequent to the storage of the full snapshot as the previous local version of the data stet, obtain the incremental snapshot and apply the incremental snapshot to the previous local version of the data set to establish the local version of the data set of the primary data store.

4. The system as recited in claim 3, wherein the consumer module, when implemented by the one or more computing devices, cause the one or more computing devices to:

apply one or more additional incremental snapshots to the local version of the data set.

5. The system as recited in claim 1, wherein the consumer module, when implemented by the one or more computing devices, cause the one or more computing devices to:

provide the local version of the data set to one or more data processing applications.

6. The system as recited in claim 1, wherein to establish the local version of the data set of the primary data store, the consumer module, when implemented by the one or more computing devices, cause the one or more computing devices to:

determine that the full snapshot of the data set stored in the intermediate data store is a most recent full snapshot of a plurality of full snapshots of the data set;

locally store the most recent full snapshot as a previous local version of the data set of the primary data store; and subsequent to the storage of the most recent full snapshot as the previous local version of the data stet, obtain the incremental snapshot and apply the incremental snapshot to the previous local version of the data set to establish the local version of the data set of the primary data store.

7. The system as recited in claim 6, wherein the consumer module, when implemented by the one or more computing devices, cause the one or more computing devices to:

apply an additional incremental snapshot to the local version of the data set, wherein the additional incremental snapshot was captured after the most recent full snapshot.

8. A method, comprising:

accessing, by a consumer module, a manifest that is stored at an intermediate data store to determine a location, at the intermediate data store, of a full snapshot of a data set of a primary data store and to determine another location, at the same intermediate data store, of an incremental snapshot of the data set of the primary data store, wherein the full snapshot at the location of the intermediate data store captures a state of the data set of the primary data store at a point in time and the incremental snapshot at the other location of the same intermediate data store captures changes to the state of the data set of the primary data store since the full snapshot of the data set;

based on the determination, by the consumer module, of the location of the full snapshot and the other location of the incremental snapshot indicated by the manifest that is stored at the intermediate data store, obtaining, by the consumer module from the intermediate data store:

the full snapshot of the data set of a primary data store from the location of the intermediate data store, and the incremental snapshot of the data set of the primary data store from the other location of the same intermediate data store; and establishing, by the consumer module, a local version of the data set of the primary data store according to the full snapshot of the data set and the incremental snapshot of the data set that are both obtained by the consumer module from the same intermediate data store, wherein the local version of the data set is stored at a snapshot consumer system.

9. The method as recited in claim 8, wherein establishing the local version of the data set comprises:

applying the incremental snapshot to the full snapshot of the data set to establish the local version of the data set of the primary data store.

10. The method as recited in claim 8, wherein establishing the local version of the data set comprises:

locally storing the full snapshot as a previous local version of the data set of the primary data store; and subsequent to storing the full snapshot as the previous local version of the data stet, obtaining the incremental snapshot and applying the incremental snapshot to the previous local version of the data set to establish the local version of the data set of the primary data store.

11. The method as recited in claim 10, wherein establishing the local version of the data set comprises:

applying one or more additional incremental snapshots to the local version of the data set.

12. The method as recited in claim 8, further comprising:

providing access to the local version of the data set to one or more data processing applications.

13. The method as recited in claim 8, wherein establishing the local version of the data set comprises:

determining that the full snapshot of the data set stored in the intermediate data store is a most recent full snapshot of a plurality of full snapshots of the data set;

locally storing the most recent full snapshot as a previous local version of the data set of the primary data store; and applying the incremental snapshot to the previous local version of the data set, wherein the incremental snapshot was captured after the most recent full snapshot.

14. The method as recited in claim 8, wherein the manifest of the intermediate data store indicates an order that the incremental snapshot is to be processed with respect to one or more other incremental snapshots.

15. A non-transitory computer-readable storage medium storing program instructions that when executed on one or more computers cause the one or more computers to implement a system comprising:
one or more consumer modules, wherein a given consumer module is configured to:
access, by the consumer module, a manifest that is stored at an intermediate data store to determine a location, at the intermediate data store, of a full snapshot of a data set of a primary data store and to determine a location, at the same intermediate data store, of an incremental snapshot of the data set of the primary data store,
wherein the full snapshot at the location of the intermediate data store captures a state of the data set of the primary data store at a point in time and the incremental snapshot at the other location of the same intermediate data store captures changes to the state of the data set of the primary data store since the full snapshot of the data set;
based on the determination, by the consumer module, of the location of the full snapshot and the other location of the incremental snapshot indicated by the manifest that is stored at the intermediate data store, obtain, by the consumer module from the intermediate data store:
the full snapshot of the data set of the primary data store from the location of the intermediate data store, and
the incremental snapshot of the data set of the primary data store from the other location of the same intermediate data store; and
establish, by the consumer module, a local version of the data set of the primary data store according to the full snapshot of the data set and the incremental snapshot of the data set that are both obtained by the consumer module from the same intermediate data store, wherein the local version of the data set is stored at a snapshot consumer system.

16. The non-transitory computer-accessible storage medium as recited in claim 15, wherein the consumer module is configured to:
apply the incremental snapshot to the full snapshot of the data set to establish the local version of the data set of the primary data store.

17. The non-transitory computer-accessible storage medium as recited in claim 15, wherein the consumer module is configured to:
locally store the full snapshot as a previous local version of the data set of the primary data store; and
subsequent to the storage of the full snapshot as the previous local version of the data stet, obtain the incremental snapshot and apply the incremental snapshot to the previous local version of the data set to establish the local version of the data set of the primary data store.

18. The non-transitory computer-accessible storage medium as recited in claim 17, wherein to establish the local version of the data set of the primary data store, the consumer module is configured to:
apply one or more additional incremental snapshots to the local version of the data set.

19. The non-transitory computer-accessible storage medium as recited in claim 15, wherein to establish the local version of the data set of the primary data store, the consumer module is configured to:
determine that the full snapshot of the data set stored in the intermediate data store is a most recent full snapshot of a plurality of full snapshots of the data set;
locally store the most recent full snapshot as a previous local version of the data set of the primary data store; and
subsequent to the storage of the most recent full snapshot as the previous local version of the data stet, obtain the incremental snapshot and apply the incremental snapshot to the previous local version of the data set to establish the local version of the data set of the primary data store.

20. The non-transitory computer-accessible storage medium as recited in claim 15, wherein the consumer module is configured to:
download snapshots for two or more data sets from the intermediate data store;
combine the downloaded snapshots to generate an aggregated snapshot; and
upload the aggregated snapshot to the intermediate data store for access by one or more other consumer modules.

* * * * *